United States Patent [19]

Omura et al.

[11] Patent Number: 5,687,347
[45] Date of Patent: Nov. 11, 1997

[54] DATA PROVIDING DEVICE, FILE SERVER DEVICE, AND DATA TRANSFER CONTROL METHOD

[75] Inventors: Takeshi Omura, Kyoto; Teruto Hirota, Moriguchi; Rieko Asai, Hirakata, all of Japan

[73] Assignee: Matsushita Electric Industrial Co., Ltd., Osaka, Japan

[21] Appl. No.: 529,657

[22] Filed: Sep. 18, 1995

[30] Foreign Application Priority Data

| Sep. 19, 1994 | [JP] | Japan | 6-223716 |
| Sep. 19, 1994 | [JP] | Japan | 6-223720 |
| Oct. 13, 1994 | [JP] | Japan | 6-248080 |

[51] Int. Cl.[6] ............................. G06F 12/00; G06F 13/30
[52] U.S. Cl. ................................. 395/439; 395/872
[58] Field of Search ............................. 395/439, 440, 395/497.01, 890, 891, 853, 872

[56] References Cited

U.S. PATENT DOCUMENTS

| 4,489,378 | 12/1984 | Dixon | 395/853 |
| 5,163,131 | 11/1992 | Row | 395/200.01 |
| 5,239,644 | 8/1993 | Seki | 395/872 |
| 5,253,341 | 10/1993 | Rozmanith et al. | |
| 5,305,389 | 4/1994 | Palmer | 382/305 |
| 5,317,727 | 5/1994 | Tsuchida et al. | 395/602 |
| 5,353,430 | 10/1994 | Lautzenheiser | 395/444 |
| 5,410,635 | 4/1995 | Macon | 395/250 |
| 5,418,927 | 5/1995 | Chang | 395/490 |

FOREIGN PATENT DOCUMENTS

4-005723  1/1992  Japan .

OTHER PUBLICATIONS

Operating Systems: Design & Implementation, Tanenbaum, 1987 ISBN 0-13-637406-9.

P. Venkat Rangan et al., "Designing File Systems for Digital Video and Audio", *Proceedings of the Thirteenth ACM Symposium on Operating Systems Principles*, Pacific Grove, CA, No. SYMP. 13, pp. 81-94 (Oct. 1991).

"Prefetching Rule and Other Data from a Database", *IBM Technical Disclosure Bulletin*, vol. 37, No. 4A, pp. 511-512 (Apr. 1994).

David P. Anderson et al., "A Continuous Media I/O Server and Its Synchronization Mechanism", *Computer*, vol. 24, No. 10, pp. 51-57 (Oct. 1991).

"Demand Data Cache Prefetching to Improve the Performance of Multimedia Applications", *IBM Technical Disclosure Bulletin*, vol. 36, line 12, pp. 517-522 (Dec. 1993).

European Search Report dated Feb. 19, 1997.

C.D. Locke, "Software Architecture for Hard Real-Time Applications: Cyclic Executives vs Fixed Priority Executives", Real Time Systems, vol. 4, No. 1, pp. 37-53 (Mar. 1992).

R. Govindan et al., "Scheduling and IPC Mechanisms for Continous Media", Operating Systems Review (SIGOPS), vol. 25, No. 5, pp. 68-80 (Jan. 1991).

European Search Report dated Nov. 5, 1996.

*Primary Examiner*—Tod R. Swann
*Assistant Examiner*—Christopher S. Chow
*Attorney, Agent, or Firm*—Ratner & Prestia

[57] ABSTRACT

The data providing device has a request input means for receiving data request commands from data request sections of a plurality of data request devices, a request-command storing section for storing the data request commands by grouping them for each data request section of each data request device, a data generating section for generating data in accordance with the data request commands, a data transmitting section for transmitting the data generated by the data generating section to the data request sections of the data request devices over a network, and a request-command sequencing control section for transferring the data request commands, received from the respective data request devices and stored in the request-command storing section, to the data generating section one command at a time at predetermined intervals of time in the order in which the requests were received.

8 Claims, 27 Drawing Sheets

Fig.13A 8-1

| | AREA 1 | AREA 2 |
|---|---|---|
| BUFFER SECTION 13-1 | EMPTY | EMPTY |
| BUFFER SECTION 13-2 | EMPTY | EMPTY |

Fig.13B 8-2

| | AREA 1 | AREA 2 |
|---|---|---|
| BUFFER SECTION 13-1 | DATA 1 BLOCK 1 | EMPTY |
| BUFFER SECTION 13-2 | EMPTY | EMPTY |

Fig.13C 8-3

| | AREA 1 | AREA 2 |
|---|---|---|
| BUFFER SECTION 13-1 | DATA 1 BLOCK 1 | DATA 1 BLOCK 2 |
| BUFFER SECTION 13-2 | EMPTY | EMPTY |

Fig.13D 8-4

| | AREA 1 | AREA 2 |
|---|---|---|
| BUFFER SECTION 13-1 | DATA 1 BLOCK 1 | DATA 1 BLOCK 2 |
| BUFFER SECTION 13-2 | DATA 2 BLOCK 1 | DATA 2 BLOCK 2 |

Fig.13E 8-5

| | AREA 1 | AREA 2 |
|---|---|---|
| BUFFER SECTION 13-1 | EMPTY | DATA 1 BLOCK 2 |
| BUFFER SECTION 13-2 | DATA 2 BLOCK 1 | DATA 2 BLOCK 2 |

Fig.13F 8-6

| | AREA 1 | AREA 2 |
|---|---|---|
| BUFFER SECTION 13-1 | DATA 1 BLOCK 3 | DATA 1 BLOCK 2 |
| BUFFER SECTION 13-2 | DATA 2 BLOCK 1 | DATA 2 BLOCK 2 |

Fig.13G 8-7

| | AREA 1 | AREA 2 |
|---|---|---|
| BUFFER SECTION 13-1 | DATA 1 BLOCK 3 | DATA 1 BLOCK 2 |
| BUFFER SECTION 13-2 | EMPTY | DATA 2 BLOCK 2 |

Fig.14A 8-8

|  | AREA 1 | AREA 2 |
|---|---|---|
| BUFFER SECTION 13-1 | DATA 1 BLOCK 3 | DATA 1 BLOCK 2 |
| BUFFER SECTION 13-2 | DATA 2 BLOCK 3 | DATA 2 BLOCK 2 |

Fig.14B 8-9

|  | AREA 1 | AREA 2 |
|---|---|---|
| BUFFER SECTION 13-1 | DATA 1 BLOCK 3 | EMPTY |
| BUFFER SECTION 13-2 | DATA 2 BLOCK 3 | DATA 2 BLOCK 2 |

Fig.14C 8-10

|  | AREA 1 | AREA 2 |
|---|---|---|
| BUFFER SECTION 13-1 | DATA 1 BLOCK 3 | DATA 1 BLOCK 4 |
| BUFFER SECTION 13-2 | DATA 2 BLOCK 3 | DATA 2 BLOCK 2 |

Fig.14D 8-11

|  | AREA 1 | AREA 2 |
|---|---|---|
| BUFFER SECTION 13-1 | DATA 1 BLOCK 3 | DATA 1 BLOCK 4 |
| BUFFER SECTION 13-2 | DATA 2 BLOCK 3 | EMPTY |

Fig.14E 8-12

|  | AREA 1 | AREA 2 |
|---|---|---|
| BUFFER SECTION 13-1 | DATA 1 BLOCK 3 | DATA 1 BLOCK 4 |
| BUFFER SECTION 13-2 | DATA 2 BLOCK 3 | DATA 2 BLOCK 4 |

Fig. 15A 9-1

| DATA TYPE | BLOCK NUMBER OF PREVIOUS DATA PREFETCH REQUEST | NUMBER OF DISPLACED BLOCKS |
|---|---|---|
| DATA 1 | -1 | 1 |
| DATA 2 | -1 | 1 |

Fig. 15B 9-2

| DATA TYPE | BLOCK NUMBER OF PREVIOUS DATA PREFETCH REQUEST | NUMBER OF DISPLACED BLOCKS |
|---|---|---|
| DATA 1 | 1 | 1 |
| DATA 2 | -1 | 1 |

Fig. 15C 9-3

| DATA TYPE | BLOCK NUMBER OF PREVIOUS DATA PREFETCH REQUEST | NUMBER OF DISPLACED BLOCKS |
|---|---|---|
| DATA 1 | 1 | 1 |
| DATA 2 | 1 | 1 |

Fig. 15D 9-4

| DATA TYPE | BLOCK NUMBER OF PREVIOUS DATA PREFETCH REQUEST | NUMBER OF DISPLACED BLOCKS |
|---|---|---|
| DATA 1 | 2 | 1 |
| DATA 2 | 1 | 1 |

Fig. 15E 9-5

| DATA TYPE | BLOCK NUMBER OF PREVIOUS DATA PREFETCH REQUEST | NUMBER OF DISPLACED BLOCKS |
|---|---|---|
| DATA 1 | 2 | 1 |
| DATA 2 | 2 | 1 |

Fig. 22

| TERMINAL DEVICE | OUTPUT DATA | FREE AREA |
|---|---|---|
| A1 | START ADDRESS = A, DATA LENGTH = 50 BLOCKS | 100 BLOCKS |
| A2 | START ADDRESS = H, DATA LENGTH = 100 BLOCKS | 50 BLOCKS |
| A3 | START ADDRESS = NULL, DATA LENGTH = 0 BLOCK | 150 BLOCKS |
| ......... | ......... | ......... |
| An | START ADDRESS = I, DATA LENGTH = 70 BLOCKS | 80 BLOCKS |

BUFFER MEMORY A1: | EMPTY | EMPTY |

BUFFER MEMORY A2: | EMPTY | EMPTY |

BUFFER MEMORY A1: | DATA 1 BLOCK 1 | EMPTY |

BUFFER MEMORY A2: | EMPTY | EMPTY |

BUFFER MEMORY A1: | DATA 1 BLOCK 1 | DATA 1 BLOCK 2 |

BUFFER MEMORY A2: | DATA 2 BLOCK 1 | EMPTY |

BUFFER MEMORY A1: | DATA 1 BLOCK 1 | DATA 1 BLOCK 2 |

BUFFER MEMORY A2: | DATA 2 BLOCK 1 | DATA 2 BLOCK 2 |

Fig.24A (6-5)

| BUFFER MEMORY A1 | EMPTY | DATA 1 BLOCK 2 |
|---|---|---|

| BUFFER MEMORY A2 | DATA 2 BLOCK 1 | DATA 2 BLOCK 2 |
|---|---|---|

Fig.24B (6-6)

| BUFFER MEMORY A1 | DATA 1 BLOCK 3 | DATA 1 BLOCK 2 |
|---|---|---|

| BUFFER MEMORY A2 | DATA 2 BLOCK 1 | DATA 2 BLOCK 2 |
|---|---|---|

Fig.24C (6-7)

| BUFFER MEMORY A1 | DATA 1 BLOCK 3 | DATA 1 BLOCK 2 |
|---|---|---|

| BUFFER MEMORY A2 | EMPTY | DATA 2 BLOCK 2 |
|---|---|---|

Fig.24D (6-8)

| BUFFER MEMORY A1 | DATA 1 BLOCK 3 | DATA 1 BLOCK 2 |
|---|---|---|

| BUFFER MEMORY A2 | DATA 2 BLOCK 3 | DATA 2 BLOCK 2 |
|---|---|---|

Fig.25A 7-1

| OUTPUT DATA | FREE AREA |
|---|---|
| START ADDRESS = NULL, DATA LENGTH = 0 BLOCK | 2 BLOCKS |

Fig.25B 7-2

| OUTPUT DATA | FREE AREA |
|---|---|
| START ADDRESS = A, DATA LENGTH = 1 BLOCK | 1 BLOCK |

Fig.25C 7-3

| OUTPUT DATA | FREE AREA |
|---|---|
| START ADDRESS = A, DATA LENGTH = 2 BLOCKS | 0 BLOCK |

Fig.25D 7-4

| OUTPUT DATA | FREE AREA |
|---|---|
| START ADDRESS = A, DATA LENGTH = 2 BLOCKS | 0 BLOCK |

Fig.26A 7-5

| OUTPUT DATA | FREE AREA |
|---|---|
| START ADDRESS = B, DATA LENGTH = 1 BLOCK | 1 BLOCK |

Fig.26B 7-6

| OUTPUT DATA | FREE AREA |
|---|---|
| START ADDRESS = B, DATA LENGTH = 2 BLOCKS | 0 BLOCK |

Fig.26C 7-7

| OUTPUT DATA | FREE AREA |
|---|---|
| START ADDRESS = B, DATA LENGTH = 2 BLOCKS | 0 BLOCK |

Fig.26D 7-8

| OUTPUT DATA | FREE AREA |
|---|---|
| START ADDRESS = B, DATA LENGTH = 2 BLOCKS | 0 BLOCK |

DATA PROVIDING DEVICE, FILE SERVER DEVICE, AND DATA TRANSFER CONTROL METHOD

BACKGROUND OF THE INVENTION

1. Field of The Invention

The present invention relates to a data providing device and a file server device that operate in a network environment and that service data such as video data, textual data, and the like to attached terminals on demand, and also relates to a data transfer control method for prefetching data from a storage device storing large volumes of voice and video data, etc. and for outputting the data to terminals.

2. Related Art of the Invention

In recent years, with advances in network technology, data providing devices have been made much use of for server-client systems where server devices provide data over a network to client devices on demand.

FIG. 5 shows the configuration of one such data providing device of the prior art. In FIG. 5, reference numeral 300 is the data providing device which provides data, 310 is a first data-request device which makes a request for data, 320 is a second data-request device which makes a request for data, 311 and 321 are data request sections which sequentially send data request commands for requesting part of a stream data to the data providing device 300 and receive response data from the data providing device 300, 301 is a request input section which receives data request commands from the data request sections 311 and 321, 302 is a data generating section which generates data to be provided to the data request devices 310 and 320, and 303 is a data transmitting section which transmits response data generated by the data generating section 302 to the data request devices 310 and 320. Further, reference numeral 330 is a network for linking the data request devices 310 and 320 to the data providing device 300.

The operation of the thus configured prior art data providing device will be described in sequence of steps.

(Step 1) A data request command from the data request section 311 of the first data-request device 310 is input to the request input section 301.

(Step 2) The data request command is transferred to the data generating section 302, which generates response data in accordance with the data request command and passes the data to the data transmitting section 303.

(Step 3) The data transmitting section 303 transmits the response data to the data request section 311 of the data request device 310 over the network 330.

The following describes how the data providing device operating in the above manner will operate when the data request section 321 of the second data-request device 320 sends many data request commands at a time.

(Step 4) Many data request commands sent by the data request section 321 of the second data-request device 320 are received by the request input section 301.

(Step 5) After that, a data request command from the data request section 311 of the first data-request device 310 is received by the request input section 301.

(Step 6) The data generating section 302 first creates response data in response to the data request commands from the data request section 321 of the second data-request device 320, and then creates response data in response to the data request command from the data request section 311 of the first data-request device 310.

(Step 7) The data transmitting section 303 first transmits many response data items to the data request section 321 of the second data-request device 320, and then transmits response data to the data request section 311 of the first data-request device 310.

However, the prior art data providing device of the above configuration has had the problem that when a data request section of a particular data request device sends many data request commands at a time, the data generating section and the network are monopolized by that particular data request device, as illustrated in the above example, so that a data request command from a data request section of any other data request device cannot be serviced immediately.

On the other hand, with advances in computer technology, file server devices have come to be used that service data such as video data and textual data to attached terminals on demand.

FIG. 16 is a diagram showing the configuration of one such file server device of the prior art. In FIG. 16, reference numeral 401 designates an auxiliary storage device in which data such as video data and textual data are stored. Reference numeral 402 is a read section for reading (retrieving) data from the auxiliary storage device 401; 403 is a buffer section for storing retrieved data; 404 is a transmitting section for transmitting the data stored in the buffer section 403 out to a terminal; 405 is a request accepting section for accepting a data read request sent by a terminal; and 406-1 to 406-n are terminals each for sending a data read request to the request accepting section 405 and for receiving data from the transmitting section 404.

FIG. 17 is a block diagram showing a specific example in which the prior art file server device of FIG. 16 is implemented using a CPU, etc. In FIG. 17, reference numeral 411 indicates an auxiliary storage device in which data such as video data and textual data are stored. Reference numeral 412 is a CPU that performs arithmetic and other operations; 413 is a memory which provides a buffer and a work area; 414 is a disk I/F through which data is read from the auxiliary storage device 411; 415 is a network I/F through which a request sent by a terminal is accepted and data is transmitted to the terminal; 416 is an internal bus for carrying work data and data read from the auxiliary storage device 411; and 417-1 to 417-n are terminals. In this configuration, the request accepting section 405 or transmitting section 404 shown in FIG. 16 is constructed from the CPU 412, the network I/F 415, etc., while the read section 402 is constructed from the disk I/F 414, etc., and the buffer section 403 from a portion of the memory 413.

Next, the operation of the above configured prior art file server device will be described with reference to FIG. 16.

(1) The terminal, 406-1 to 406-n, sends a data read request to the request accepting section 405.

(2) The request accepting section 405 passes the data read request to the read section 402, while outputting a data transmit request to the transmitting section 404.

(3) When the data read request is received from the request accepting section 405, the read section 402 retrieves the requested data from the auxiliary storage device 401 and stores the data in the buffer section 403.

(4) When the data transmit request is received from the request accepting section 405, the transmitting section 404 transmits the data read by the read section 402 and stored in the buffer section 403 out to the requesting terminal, 406-1 to 406-n.

(5) Steps (1) to (4) are repeated.

By performing the above operation, the file server device can service data in accordance with requests from the terminals.

In the prior art file server device of the above configuration, when data is read out of the auxiliary storage device the data flows through the internal bus 416 in the file server device until the data is sent out (see FIG. 17); however, since there is a limit to the amount of data that can flow through the internal bus 416, the prior art has had the problem that the number of terminals cannot be increased.

On the other hand, recent computer systems are equipped with large-capacity storage devices, and reducing the access time of storage devices is imperative for the construction of high-speed computer systems. Since access speeds of storage devices are generally slower than data transfer speeds or data processing speeds, a strategy has been employed to increase the processing speed of the entire system by prefetching data contiguous to requested data into a buffer memory or the like before the data is actually requested, thereby reducing the number of future accesses to the storage device.

A prior art data transfer control method will be described below.

FIG. 27 is a diagram showing the configuration of a system in which the prior art data transfer control method is employed. In FIG. 27, reference numeral 80 is a storage device for storing data, 82 is a buffer memory for temporarily holding data, 81 is a data prefetch section for reading data requested by a terminal 85 and data contiguous to the requested data into the buffer memory 82, and 84 is a transmitting section for transmitting data stored in the buffer memory 82 out to the terminal 85. Further, reference numeral 83 is a judging section which causes data stored in the buffer memory 82 to be transferred to the transmitting section 84 when the data requested by the terminal 85 is available in the buffer memory 82, and which requests the data prefetch section 81 to read data when the requested data is not available in the buffer memory 82.

The operation according to the prior art data transfer control method in the above configuration will be described below.

(1) The judging section 83 makes a judgement as to whether the data requested by the terminal 85 is available in the buffer memory 82.

(2) If it is judged that the data requested by the terminal 85 is available in the buffer memory 82, the judging device 83 causes the data stored in the buffer memory 82 to be transferred to the transmitting section 84.

(3) The transmitting section 84 transmits the data transferred from the buffer memory 82 out to the requesting terminal 85.

(4) If it is judged that the data requested by the terminal 85 is not available in the buffer memory 82, the judging section 83 requests the data prefetch section 81 to read the requested data and also data contiguous to the requested data.

(5) The data prefetch section 81 reads the requested data and the data contiguous to it from the storage device 80 and stores them in the buffer memory 82.

(6) The transmitting section 84 transmits the requested data stored in the buffer memory 82 out to the requesting terminal 85.

Such a configuration is implemented, for example, in a disk drive developed by Toshiba (Japanese Patent Unexamined Publication No. 4-5723).

However, the above prior art data transfer control method has had the problem that since data prefetching cannot be performed with well-balance for a plurality of terminals making data requests, the buffer memory is monopolized by a data request issued from a particular terminal and prefetching for other terminals cannot be performed during that time. As a result, there occurs an unbalance between the data transmission for the data request from the particular terminal and that for the data requests from other terminals, thus transmitting data at unbalanced rates for different terminals.

Furthermore, the prior art method has had the problem of being unable to perform continuous and effective data prefetching, because, once data has been stored in the buffer memory, it is not possible to continue prefetching contiguous data even after the requested data has been output from the buffer memory.

SUMMARY OF THE INVENTION

In view of the above-enumerated problems of the data providing device, file server device, and data transfer control method of the prior art, it is an object of the present invention to provide a data providing device capable of providing data with well-balance for data request sections of a plurality of data request devices, a file server device that allows the number of terminals to be increased compared to the prior art device, and a data transfer control method that can perform data prefetching with well-balance for a plurality of terminals, can transmit data at equal rates, and can improve the speed of processing.

The data providing device of the present invention comprises: a request input section for receiving data request commands, sent over a network from a plurality of data request sections of a plurality of data request devices, for sequentially requesting blocks of stream data; a request-command storing section for storing the data request commands received by the request input section by grouping the request commands for each data request section of each data request device; a data generating section for generating data of a predetermined size in accordance with the data request commands; a data transmitting section for transmitting the data generated by the data generating section to the data request devices over the network; and a request-command sequencing control section for transferring the plurality of data request commands, stored in the request-command storing section in corresponding relationship to each data request section, to the data generating section successively at predetermined intervals of time in the order in which the request commands were received from the data request sections and with a predetermined proportion for the same data request section. Accordingly, data can be provided with well-balance to the plurality of data request sections of the plurality of data request devices, for example, by storing the data request commands, received from the plurality of data request sections of the plurality of data request devices, into the request-command storing section in corresponding relationship to each data request section, and by transferring the data request commands one at a time to the data generating section at predetermined intervals of time.

The data providing device of the invention thus has the advantage that the data generating section and the network bandwidth can be utilized more effectively than the prior art device.

The file server device of the present invention comprises: a storage device for storing data; a plurality of prefetch fill sections for prefetching data from the storage device; a plurality of buffer sections for storing the respectively prefetched data; a plurality of transmitting sections for transmitting the data stored in the buffer sections to terminals; a request accepting section for accepting a data read request, sent by a terminal, for reading data from the storage device; prefetch judging means for judging, based on data requested by an immediately preceding data read request or on an index pointing to that data, whether data requested by the accepted data read request is already prefetched and stored in one of the buffer sections; and request output means for, when it is judged that the requested data is not yet prefetched, outputting a prefetch request to one of the prefetch fill sections and a transmit request to one of the transmitting sections, both of the one sections corresponding to the terminal issuing the data read request, and for, when it is judged that the requested data is already prefetched, outputting a transmit request to one of the transmitting sections, the one section corresponding to the terminal issuing the data read request.

In this configuration, the request accepting section accepts a data read request sent by a terminal; the prefetch judging means judges, based on data requested by an immediately preceding data read request or on an index pointing to that data, whether data requested by the accepted data read request is already prefetched and stored in one of the buffer sections; when it is judged that the requested data is not yet prefetched, the request output means outputs a prefetch request to the prefetch fill section and a transmit request to the transmitting section corresponding to the terminal issuing the data read request, and when it is judged that the requested data is already prefetched, outputs a transmit request to the transmitting section corresponding to the terminal issuing the data read request. At this time, the prefetch fill section reads data from the storage device and stores it in the corresponding buffer section each time free space becomes available in the buffer section after requested data is transmitted to the terminal.

Accordingly, the file server device of the invention has the advantage that the number of terminals that can be attached can be further increased compared to the prior art device.

According to the data transfer control method of the present invention, a judgement is made as to whether data requested by any one of a plurality of terminals is contiguous to data previously requested by that terminal; when it is judged that the requested data is not contiguous, the data requested by that terminal and data contiguous to the requested data are retrieved from a storage device and stored in a buffer memory corresponding to the terminal issuing the data request and the stored data is then transmitted to the requesting terminal, the buffer memory being one of a plurality of buffer memories provided in corresponding relationship to the plurality of terminals, and when it is judged that the requested data is contiguous, data stored in the buffer memory corresponding to the requesting terminal by the previous data request is transmitted to the terminal, while data contiguous to the data stored in the buffer memory are retrieved from the storage device at predetermined intervals of time and stored in the buffer memory.

In this manner, the buffer memories are provided in corresponding relationship to the plurality of terminals, and a judgement is made as to whether data requested by a terminal is contiguous to, data previously requested by that terminal; when the requested data is not contiguous, the data requested by that terminal and data contiguous to the requested data are retrieved from a storage device and stored in the buffer memory corresponding to the requesting terminal and the thus stored data is transmitted to the terminal, and when the requested data is contiguous, data stored in the buffer memory by the previous data request is transmitted to the requesting terminal, while data contiguous to the data stored in the buffer memory are retrieved from the storage device at predetermined intervals of time and stored in the buffer memory. Accordingly, the data transfer control method of the invention has the advantages that data prefetching can be performed with well-balance for a plurality of terminals, that data can be transmitted at equal rates, and that the speed of processing can be improved.

BRIEF DESCRIPTION OF THE DRAWINGS

FIG. 3 is a block diagram showing the configuration of a data providing device according to a second embodiment of the present invention.

FIG. 5 is a diagram showing the configuration of a data providing device according to the prior art.

FIGS. 13a–13g are diagrams showing how data are stored in buffer sections according to the third embodiment.

FIGS. 14a–14e are diagrams showing in another state how data is stored in buffer sections according to the third embodiment.

FIGS. 15a–15e are diagrams showing a prefetch judgement table in the displacement judging section according to the third embodiment.

FIG. 22 is a schematic diagram illustrating an example of data stored in a buffer management memory according to the fourth embodiment.

FIGS. 23a–23d are diagrams illustrating by way of example how data in buffer memories change according to the fourth embodiment.

FIGS. 24a–24d are continuations of FIGS. 23a–23d, illustrating by way of example how data in buffer memories change.

FIGS. 25a–25d are schematic diagrams illustrating an example of data stored in the buffer management memory according to the fourth embodiment.

FIGS. 26a–26d are continuations of FIGS. 25a–25d illustrating an example of data stored in the buffer management memory.

[DESCRIPTION OF THE REFERENCE NUMERALS]

100, 200, 300—data providing device, 101, 201, 301—request input section, 102, 202, 302—data generating section, 103, 203, 303—data transmitting section, 104, 204—request-command storing section, 105—request-command sequencing section, 110, 120, 210, 220, 310, 320—data request device, 111, 121, 211, 221, 311, 321—data request section, 205, request-command rate control section, 11, 401—auxiliary storage device, 12-1–12-n prefetch fill section, 13-1–13-n, 403—buffer section, 14-1–14-n, 404—transmitting section, 15, 405—request accepting section, 16—displacement judging section, 17—prefetch request distributing section, 18—transmit request distributing section, 19-1–19-n, 20-1–20-n terminal, 406-1–406-n, 417-1–417-n terminal, 80, 501—storage device, 81, 504—data prefetch section, 82, 505—buffer memory, 85, 510—terminal, 502—data control section, 503—prefetch permit output section, 506—buffer management memory, 507—hit judging section, 508—request judging section, 509—data transmitting section, 511—network interface

PREFERRED EMBODIMENTS

The preferred embodiments of the present invention will now be described below with reference to the accompanying drawings.

(Embodiment 1)

Figure 1:
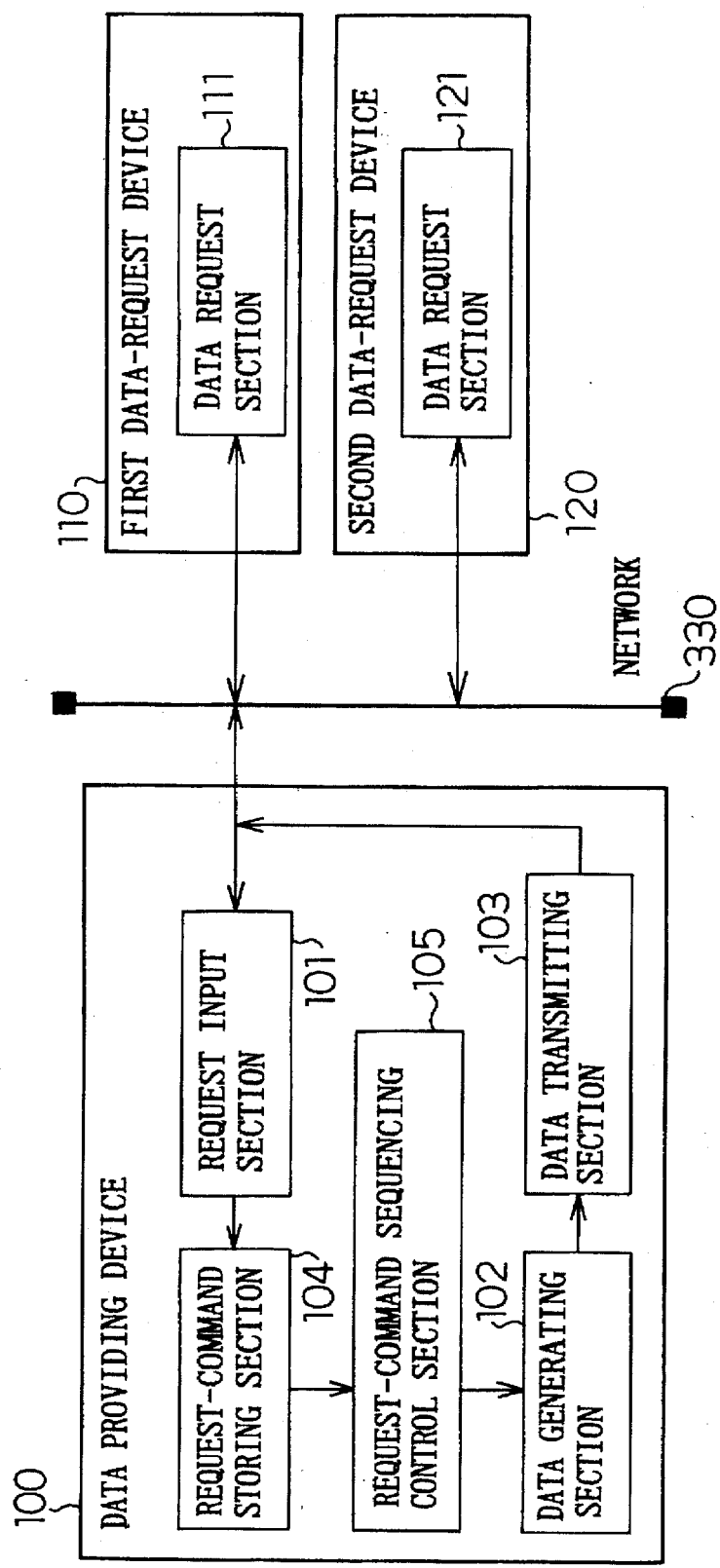
FIG. 1 is a block diagram showing the configuration of a data providing device according to a first embodiment of the present invention.

FIG. 1 is a block diagram of a data providing device according to a first embodiment of the invention. In FIG. 1, reference numeral 100 is the data providing device which provides data; 110 is a first data-request device which makes a request for data; 120 is a second data-request device which makes a request for data; 111 and 121 are data request sections which sequentially send data request commands for requesting part of a stream data to the data providing device 100 and receive response data from the data providing device 100; 101 is a request input section which accepts data request commands from the data request sections 111 and 121; 102 is a data generating section which generates data in accordance with the accepted data request commands; 103 is a data transmitting section which transmits the response data generated by the data generating section 102 to the data request sections 111 and 121 of the data request devices 110 and 120; 104 is a request-command storing section which stores the data request commands transferred from the request input section 101 by grouping them for each data request section; and 105 is a request-command sequencing control section which transfers the data request commands, received from the data request sections and stored in the request-command storing section 104, one at a time to the data generating section 102 at prescribed intervals of time and in the order in which they were received.

Figure 2:
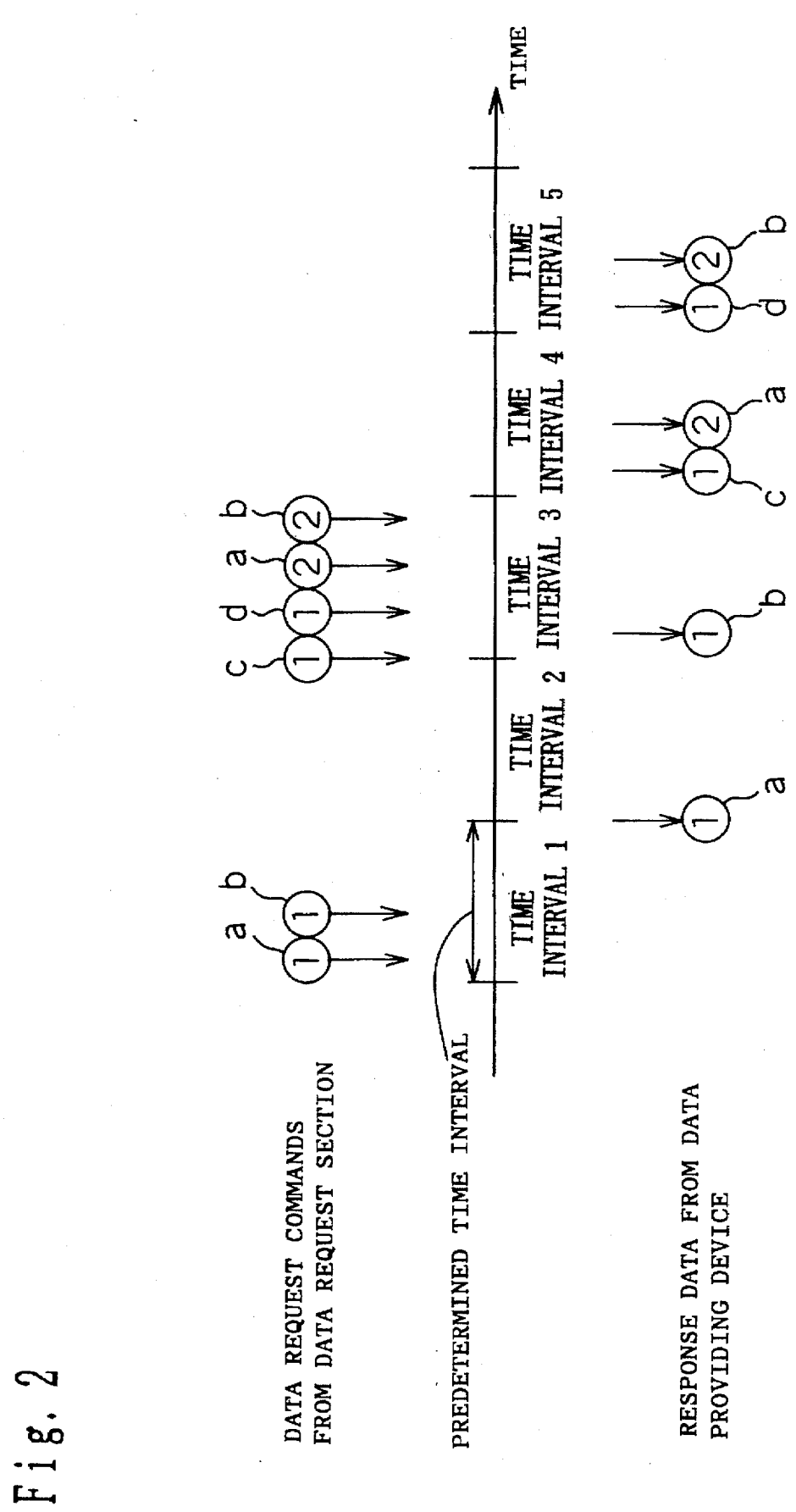
FIG. 2 is a timing diagram showing the timing of data request commands and response data according to the first embodiment of the present invention.
Figure 2:
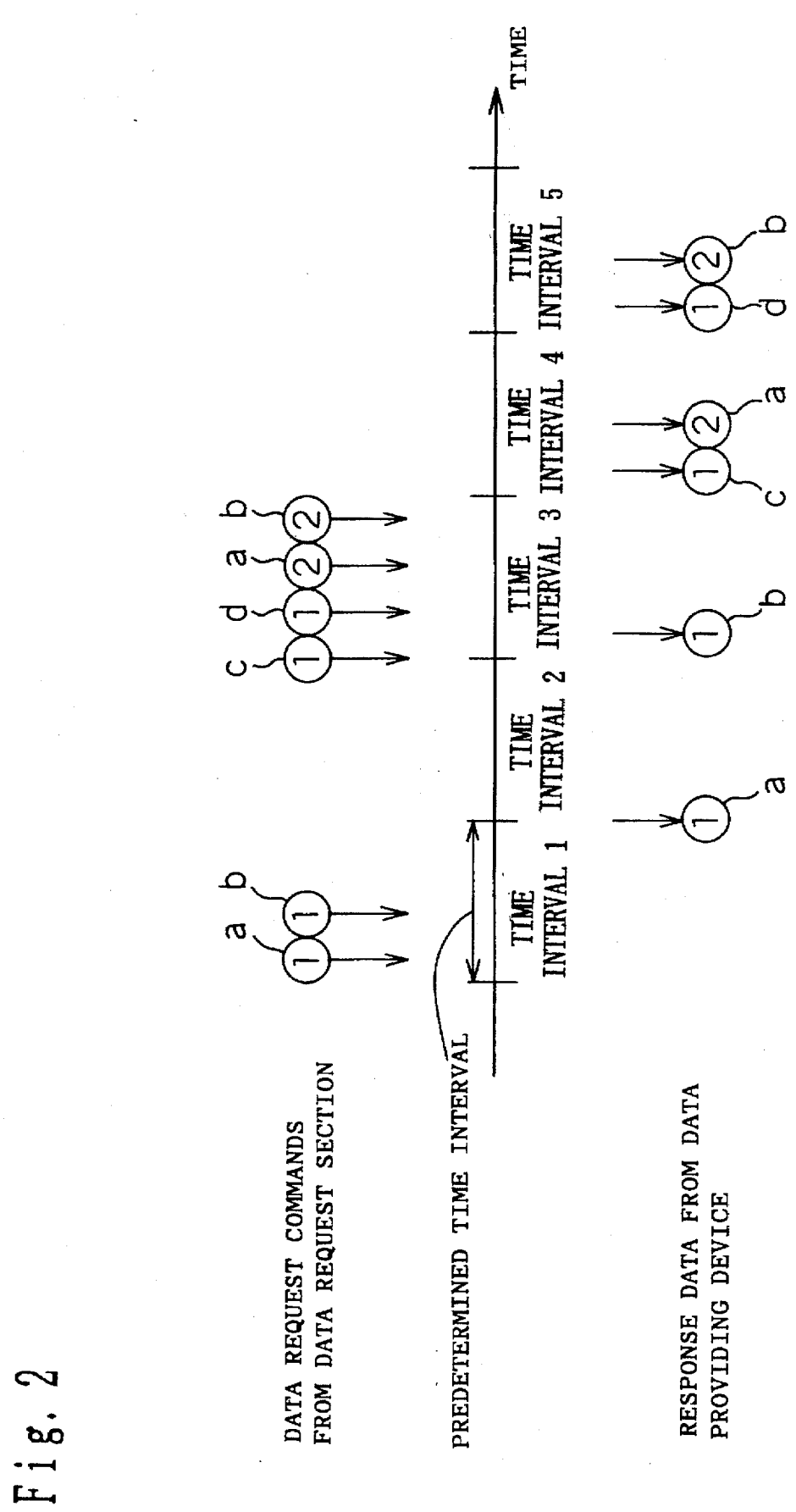

The operation of the above-configured data providing device will be described below in sequence of steps. FIG. 2 is a timing diagram showing the transmit timing of data request commands transmitted from the data request sections 111 and 121 and response data transmitted from the data transmitting section 103.

(Step 1) In time interval 1, two data request commands 1-a and 1-b from the data request section 111 of the first data-request device 110 are input to the request input section 101.

(Step 2) The data request commands are stored in the request command storing section 104.

(Step 3) In time interval 2, the request-command sequencing control section 105 retrieves the data request command 1-a stored in the request-command storing section 104 and transfers it to the data generating section 102.

(Step 4) The data generating section 102 generates response data and transfers it to the data transmitting section 103.

(Step 5) The data transmitting section 103 transmits the response data to the data request section 111 of the first data-request device 110.

(Step 6) After a predetermined time has elapsed (that is, in time interval 3), the request-command sequencing control section 105 retrieves the next command, i.e., the data request command 1-b, stored in the request-command storing section 104, and transfers it to the data generating section 102.

(Step 7) Same as step 4.

(Step 8) Same as step 5. The processing of step 6 to step 8 is repeated until all data request commands stored in the request-command storing section 104 are output.

The following describes the operation (from time interval 3 onward) when data request commands from the data request section 121 of the second data-request device 120 are input to the request input section 101 while the above operation is being performed.

(Step 9) In time interval 3, data request commands 1-c and 1-d from the data request section 111 of the first data-request device 110 and data request commands 2-a and 2-b from the data request section 121 of the second data-request device 120 are input to the request input section 101.

(Step 10) The data request commands are stored in the request-command storing section 104.

(Step 11) In time interval 4, the request-command sequencing control section 105 retrieves the data request command 1-c, issued from the data request section 111 of the first data-request device 110 and stored in the request command storing section 104, and transfers it to the data generating section 102, and next retrieves the data request command 2-a, issued from the data request section 121 of the second data-request device 120, and transfers it to the data generating section 102.

(Step 12) The data generating section 102 generates response data in accordance with the data request command 1-c issued from the data request section 111 of the first data-request device 110, and transfers it to the data transmitting section 103, and next generates response data in accordance with the data request command 2-a issued from the data request section 121 of the second data-request device 120, and transfers it to the data transmitting section 103.

(Step 13) The data transmitting section 103 transmits the response data to the data request section 111 of the first data-request device 110, and next transmits the response data to the data request section 121 of the second data-request device 120.

(Step 14) After a predetermined time has elapsed (that is, in time interval 5), the request-command sequencing control section 105 retrieves the data request command 1-d, issued from the data request section 111 of the first data-request device 110 and stored in the request command storing section 104, and transfers it to the data generating section 102, and next retrieves the data request command 2-b, issued from the data request section 121 of the second data-request device 120, and transfers it to the data generating section 102.

(Step 15) Same as step 12.

(Step 16) Same as step 13. The processing of step 14 to Step 16 is repeated until all data request commands stored in the request-command storing section 104 are output.

As described above, according to the first embodiment, since data request commands from the data request section 111 of the first data-request device 110 and data request commands from the data request section 121 of the second data-request device 120 are equally transferred to the data generating section 102, even if one data request section transmits more data request commands at a time than the other request section, the data generating section 102 and the network 330 will not be monopolized by the one request section, so that the plurality of data request devices can equally receive their respective response data.

(Embodiment 2)

FIG. 3 is a block diagram of a data providing device according to a second embodiment of the invention. In FIG. 3, reference numeral 200 is the data providing device which provides data; 210 is a first data-request device which makes a request for data; 220 is a second data-request device which makes a request for data; 211 and 221 are data request sections which sequentially send data request commands for requesting part of a stream data to the data providing device 200 and receive response data from the data providing device 200; 201 is a request input section which accepts data request commands from the data request sections 211 and 221; 202 is a data generating section which generates data in accordance with the accepted data request commands; 203 is a data transmitting section which transmits the response data generated by the data generating section 202 to the data request devices 210 and 220; 204 is a request-command storing section which stores the data request commands transferred from the request input section 201 by grouping them for each data request section; and 205 is a request-command rate control section which transfers the data request commands, received from the data request sections and stored in the request-command storing section 204, to the data generating section 202 at prescribed intervals of time and in the order in which they were received, the number of data request commands to be transferred at a time being predetermined for each data request section.

Figure 4:
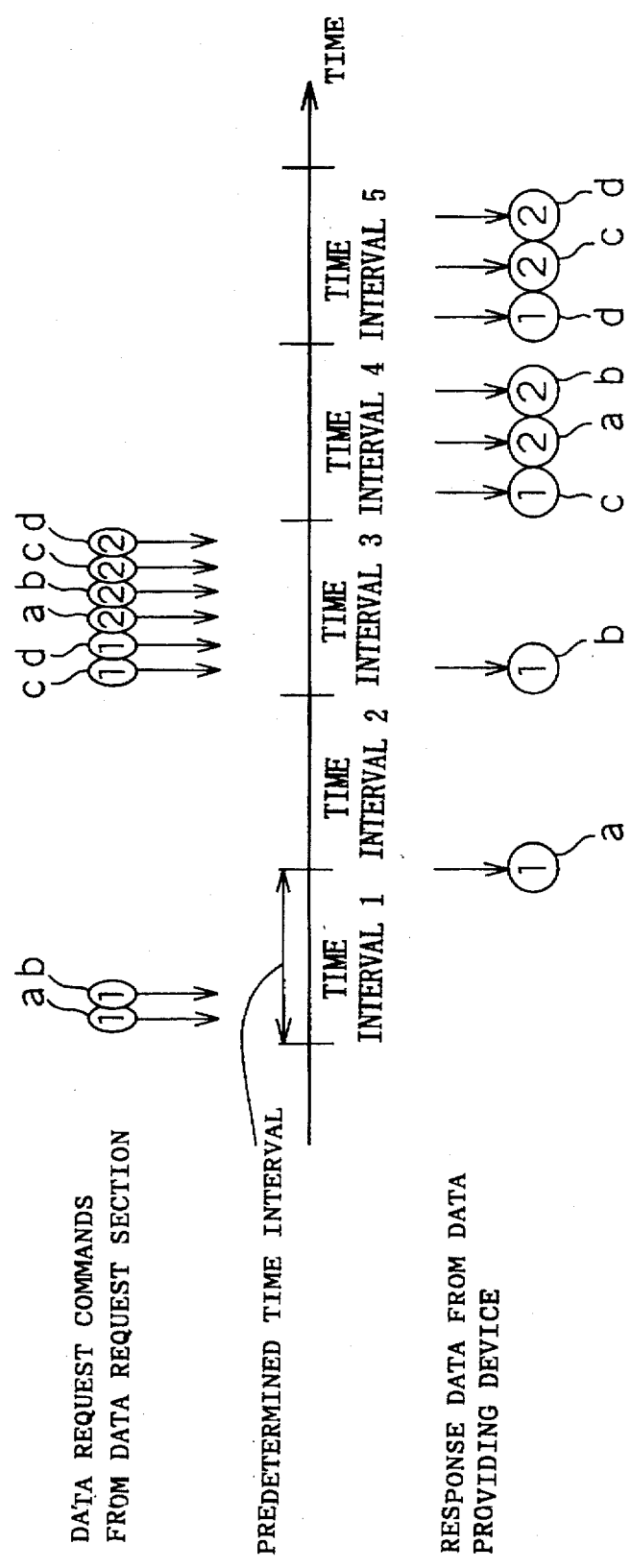
FIG. 4 is a timing diagram showing the timing of data request commands and response data according to the second embodiment of the present invention.
Figure 4:
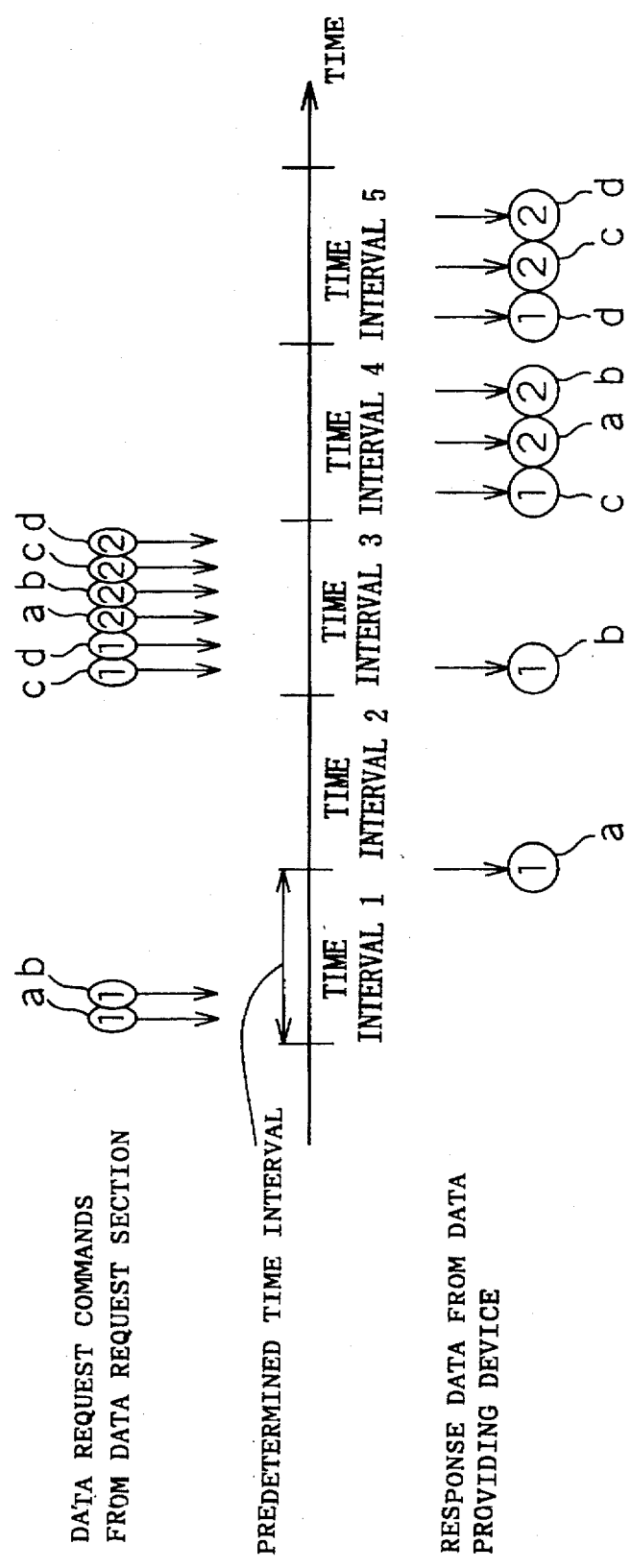

The operation of the above-configured data providing device will be described below in sequence of steps. FIG. 4 is a timing diagram showing the transmission timing of data request commands transmitted from the data request sections 211 and 221 and response data transmitted from the data transmitting section 203. It is assumed here that the request-command rate control section 205 is preset so that data request commands from the data request section 211 of the first data-request device 210 are transferred to the data generating section 203 one command at a time and data request commands from the data request section 221 of the second data-request device 220 are transferred two commands at a time.

(Step 1) In time interval 1, two data request commands 1-a and 1-b from the data request section 211 of the first data-request device 210 are input to the request input section 201.

(Step 2) The data request commands are stored in the request-command storing section 204.

(Step 3) In time interval 2, the request-command rate control section 205 retrieves one data request command (1-a) from the request-command storing section 204 in accordance with the preset value, and transfers the retrieved command to the data generating section 202.

(Step 4) The data generating section 202 generates one response data item and transfers it to the data transmitting section 203.

(Step 5) The data transmitting section 203 transmits the response data to the data request section 211 of the first data-request device 210.

(Step 6) After a predetermined time has elapsed (that is, in time interval 3), the request-command rate control section 205 retrieves one data request command (1-b) from the request-command storing section 204 in accordance with the preset value, and transfers the retrieved command to the data generating section 202.

(Step 7) Same as step 4.

(Step 8) Same as step 5. The processing of step 6 to step 8 is repeated until all data request commands stored in the request-command storing section 204 are output.

The following describes the operation (from time interval 3 onward) when data request commands from the data request section 221 of the second data-request device 220 are input to the request input section 201 while the above operation is being performed.

(Step 9) In time interval 3, two data request commands (1-c and 1-d) from the data request section 211 of the first data-request device 210 and four data request commands (2-a, 2-b, 2-c, and 2-d) from the data request section 221 of the second data-request device 220 are input to the request input section 201.

(Step 10) The data request commands are stored in the request-command storing section 204.

(Step 11) In time interval 4, the request-command rate control section 205 retrieves one data request command (1-c) from among the data request commands received from the data request section 211 of the first data-request device 210 and stored in the request-command storing section 204, and transfers the retrieved command to the data generating section 202, and next retrieves two data request command (2-a and 2-b) from among the data request commands received from the data request section 221 of the second data-request device 220, in accordance with the preset value, and transfers the retrieved commands to the data generating section 202.

(Step 12) The data generating section 202 generates one response data item in accordance with the data request command 1-c issued from the data request section 211 of the first data-request device 210, and transfers it to the data transmitting section 203, and next generates two response data items in accordance with the data request commands 2-a and 2-b issued from the data request section 221 of the second data-request device 220, and transfers them to the data transmitting section 203.

(Step 13) The data transmitting section 203 transmits the one response data item to the data request section 211 of the first data-request device 210, and next transmits the two response data items to the data request section 221 of the second data-request device 220.

(Step 14) After a predetermined time has elapsed (that is, in time interval 5), the request-command rate control section 205 retrieves one data request command (1-d) from among the data request commands received from the data request section 211 of the first data-request device 210 and stored in the request-command storing section 204, and transfers the retrieved command to the data generating section 202, and next retrieves two data request commands (2-c and 2-b) from among the data request commands received from the data request section 221 of the second data-request device 220, in accordance with the preset value, and transfers the retrieved commands to the data generating section 202.

(Step 15) Same as step 12.

(Step 16) Same as step 13. The processing of step 14 to step 16 is repeated until all data request commands stored in the request-command storing section 204 are output.

As described above, according to the second embodiment, since data request commands from the data request section 211 of the first data-request device 210 and data request commands from the data request section 221 of the second data-request device 220 are transferred to the data generating section 202 in proportions of 1:2, the second data-request device 220 can obtain response data twice as much as the first data-request device 210 can.

That is, even when the data request section of one data request device has sent many data request commands at a time, the data generating section 202 and the network 330 will not be monopolized by that data request section. Response data can therefore be provided with a predetermined ratio to a plurality of data request devices, thus effectively utilizing the data generating section 202 and the bandwidth of the network 330.

The above embodiment has been described assuming that response data are generated by the data generating section, but response data generation is not limited to the illustrated example. For example, response data may be retrieved directly from a data storage device in which data are stored, or data captured real-time may be used as the response data.

Although the above embodiment has been described as comprising two data request devices, any desired number of data request devices may be used. Further, each data request device has been described as having one data request section, but it will be recognized that more than one data request section may be provided within each data request device.

Further although the assigned number to the data request section is predetermined constant in the above embodiments, the present invention is not limited so.

That is the number which is to be assigned to the data request section can derived in such a manner that total data amount corresponding to said number of the data request commands does not exceed a predetermined threshold value. In this embodiment the data request command should have such information data that indicates data size of a response data corresponding to a data request command. Therefore the number can be calculated by using the information data of each request command in a manner that total data amount of the response data corresponding to said number of the data request commands does not exceed a predetermined threshold value.

Thus even when the size of each response data for the request command is different, response data can be provided with well-balance to the plurality of data request devices.

(Embodiment 3)

Figure 6:
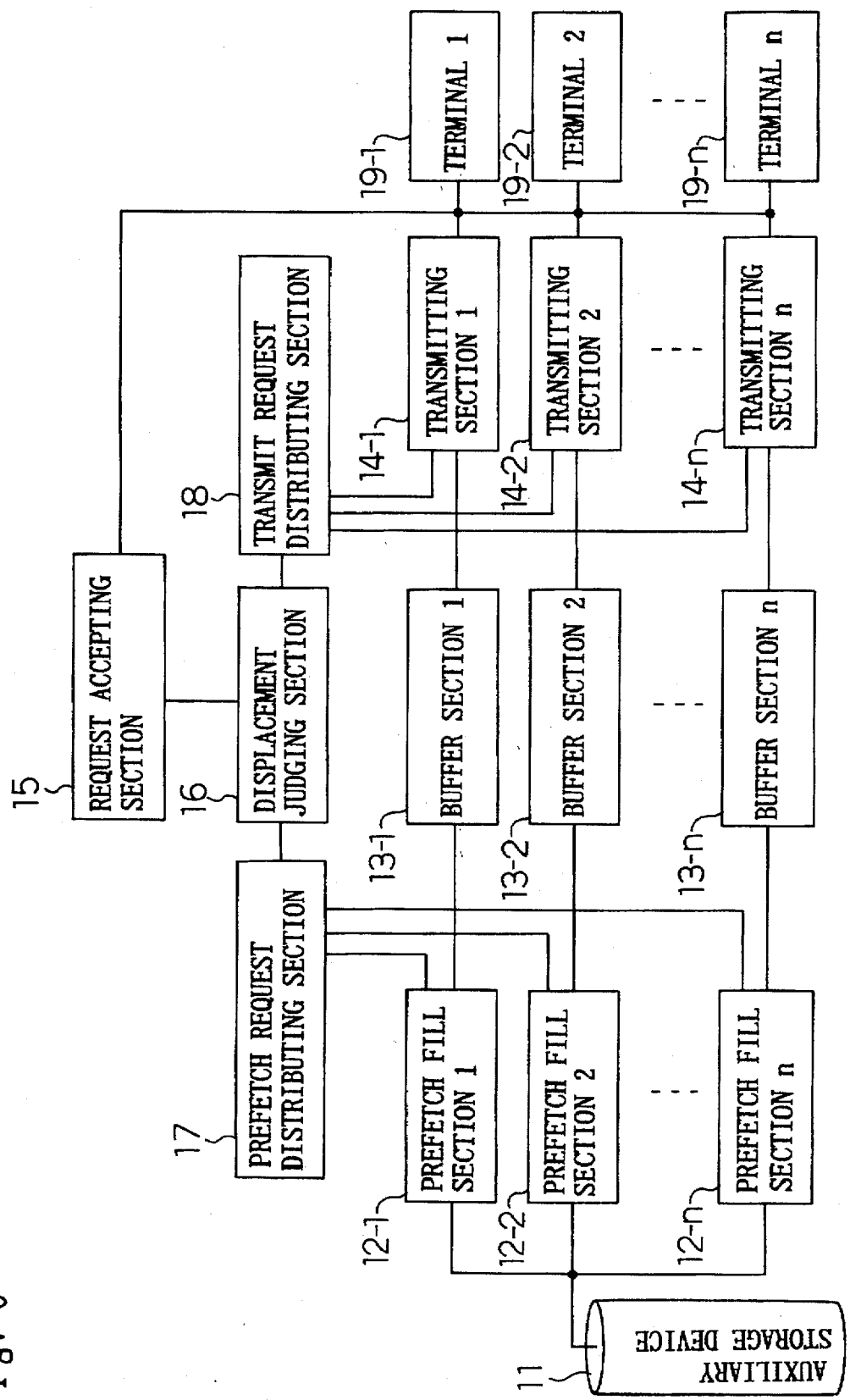
FIG. 6 is a diagram showing the configuration of a file server device according to a third embodiment of the present invention.

FIG. 6 is a diagram showing the configuration of a file server device according to a third embodiment of the invention. In FIG. 6, reference numeral 11 is an auxiliary storage device for storing data such as video data and textual data; 12-1 to 12-n are prefetch fill sections for prefetching data from the auxiliary storage device 11; 13-1 to 13-n are buffer sections for storing prefetched data; 14-1 to 14-n are transmitting sections for transmitting data to terminals; 15 is a request accepting section for accepting data read requests sent by the terminals; 16 is a displacement judging section for judging, from each data read request output from the request accepting section 15, whether prefetching should be performed or not, and for outputting a prefetch request and a data transmit request; 17 is a prefetch request distributing section for distributing prefetch requests to the prefetch fill sections 12-1 to 12-n corresponding to the terminals; 18 is a transmit request distributing section for distributing data transmit requests to the transmitting sections 14-1 to 14-n corresponding to the terminals; and 19-1 to 19-n are the terminals for transmitting data read requests to the request accepting section 15 and for receiving data from the transmitting sections 14-1 to 14-n. In this configuration, a portion of the displacement judging section 16 constitutes a prefetch judging means, and the remaining portion of the displacement judging section 16, the prefetch request distributing section 17, and the transmit request distributing section 18 together constitute a request output means.

In practice, various other component elements are necessary for implementing a hardware check function for the file server device, a write function to the auxiliary storage device 11, etc., but such component elements are omitted here since they are not the components subsumed under the present invention.

Figure 7:
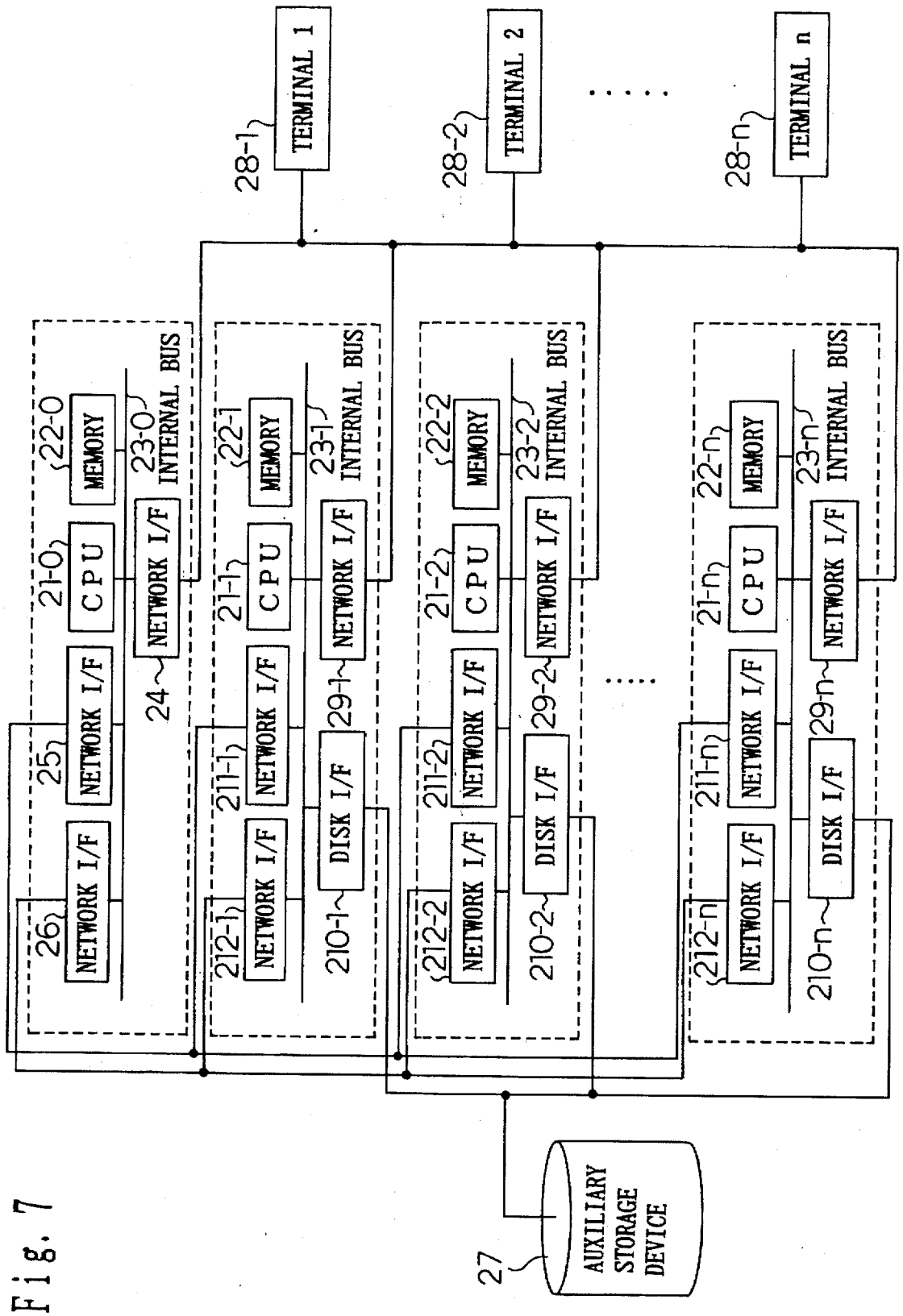
FIG. 7 is a block diagram showing a specific example of the file server device according to the third embodiment.

FIG. 7 is a block diagram showing a specific example in which the file server device of this embodiment is implemented using CPUs, memories, etc. In FIG. 7, reference numeral 27 is an auxiliary storage device for storing data such as video data and textual data; 21-0 to 21-n are memories which provide buffers and work areas; 23-0 to 23-n are internal buses for carrying work data and data read from the auxiliary storage device 27; 24 is a network I/F for accepting requests sent by terminals; 25 is a network I/F for outputting data transmit requests; 28-1 to 28-n are terminals; 29-1 to 29-n are network I/F's for transmitting data to the terminals; 210-1 to 210-n are disk I/F's for reading data from the auxiliary storage device, 27; 211-1 to 211-n are network I/F's for accepting data prefetch requests; and 212-1 to 212-n are network I/F's for accepting data transmit requests.

The request accepting section 15 of FIG. 6 is made up of the network I/F 24, the CPU 21-0, etc. Likewise, the displacement judging section 16 is composed of the CPU 21-0, the memory 22-0, etc., while the prefetch request distributing section 17 is constructed from the network I/F 25, etc. and the transmit request distributing section 18 from the network I/F 26, etc. Further, the prefetch fill sections 12-1 to 12-n are respectively constructed from the disk I/F's 210-1 to 210-n, etc., the buffer sections 13-1 to 13-n are respectively made up of the memories 22-1 to 22-n, the internal buses 23-1 to 23-n, etc., and the transmitting sections 14-1 to 14-n are respectively constructed from the network I/F's 29-1 to 29-n, etc.

Figure 8:
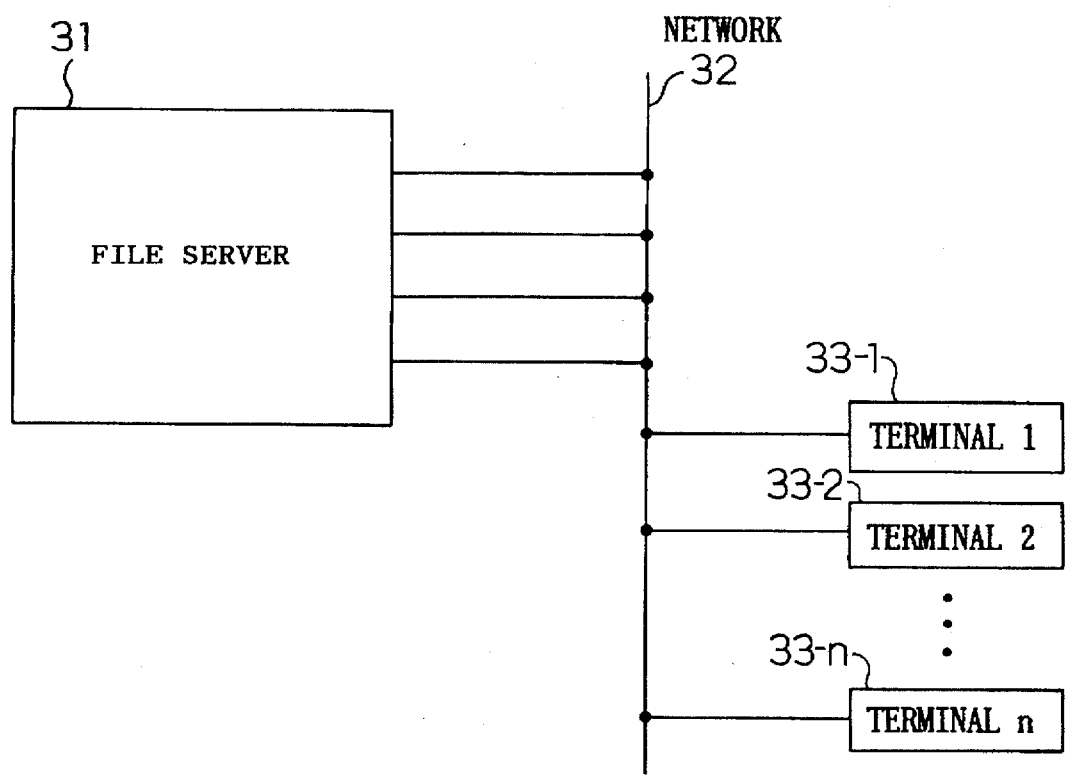
FIG. 8 is a diagram showing the connections between a file server and terminals according to the third embodiment.

FIG. 8 is a diagram showing the connections between a file server and terminals according to the above embodiment. In FIG. 8, reference numeral 31 is the file server device which outputs data such as video data and textual data, 32 is a network consisting of cables for data transmission, and 33-1 to 33-n are the terminals which request data such as video data and textual data from the file server device 31 and receive data output from the file server device 31.

Figure 12:
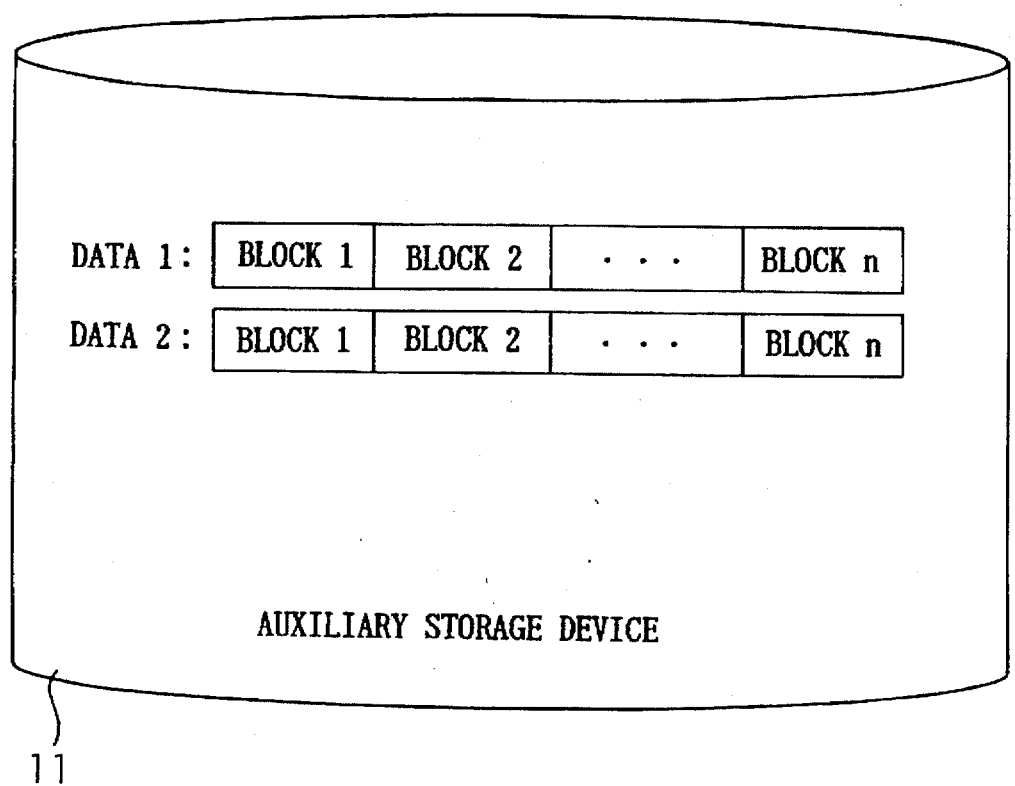
FIG. 12 is a diagram showing data stored in an auxiliary storage device and read by respective terminals according to the third embodiment.
Figure 16:
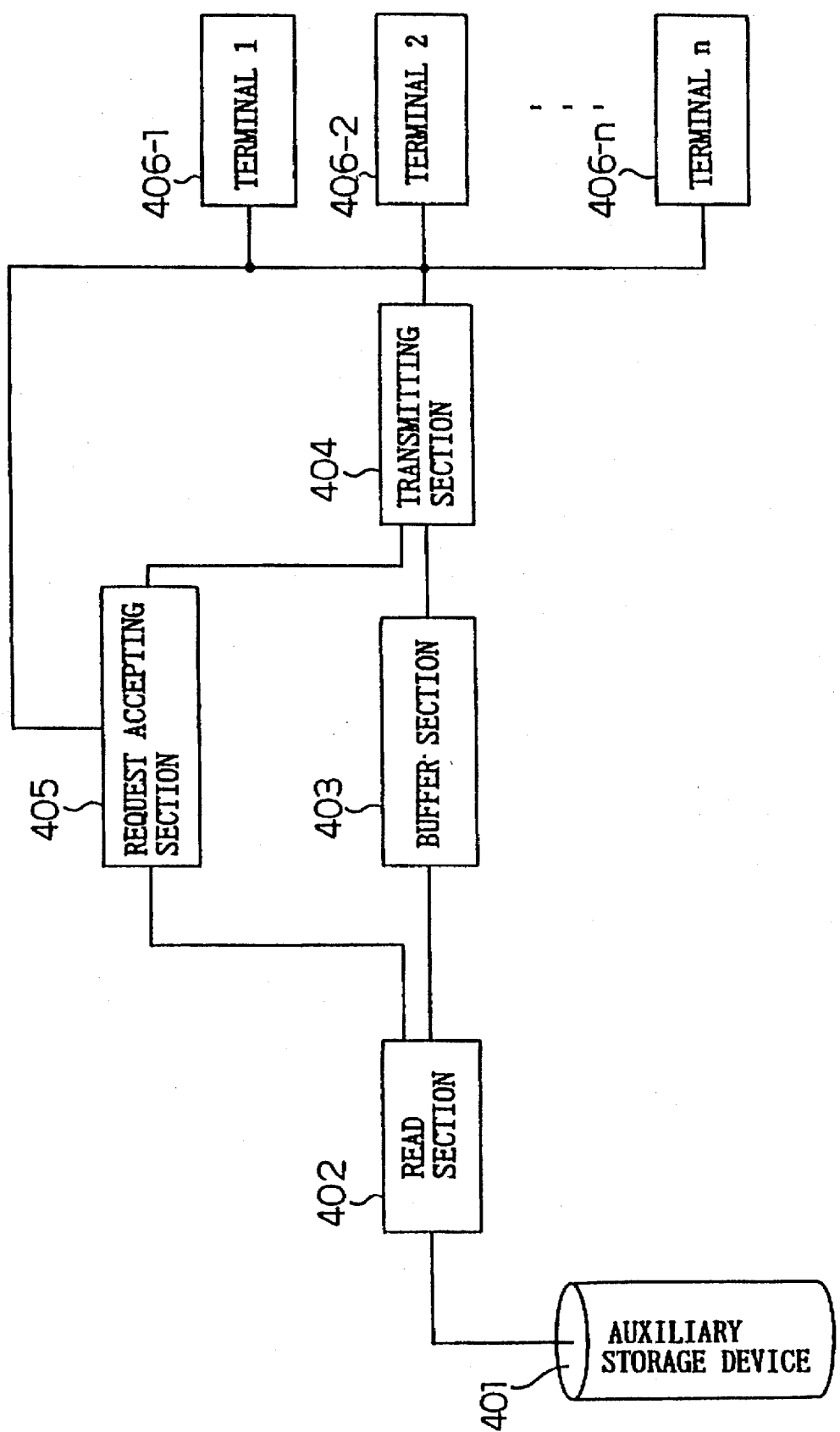
FIG. 16 is a diagram showing the configuration of a file server device according to the prior art.
Figure 17:
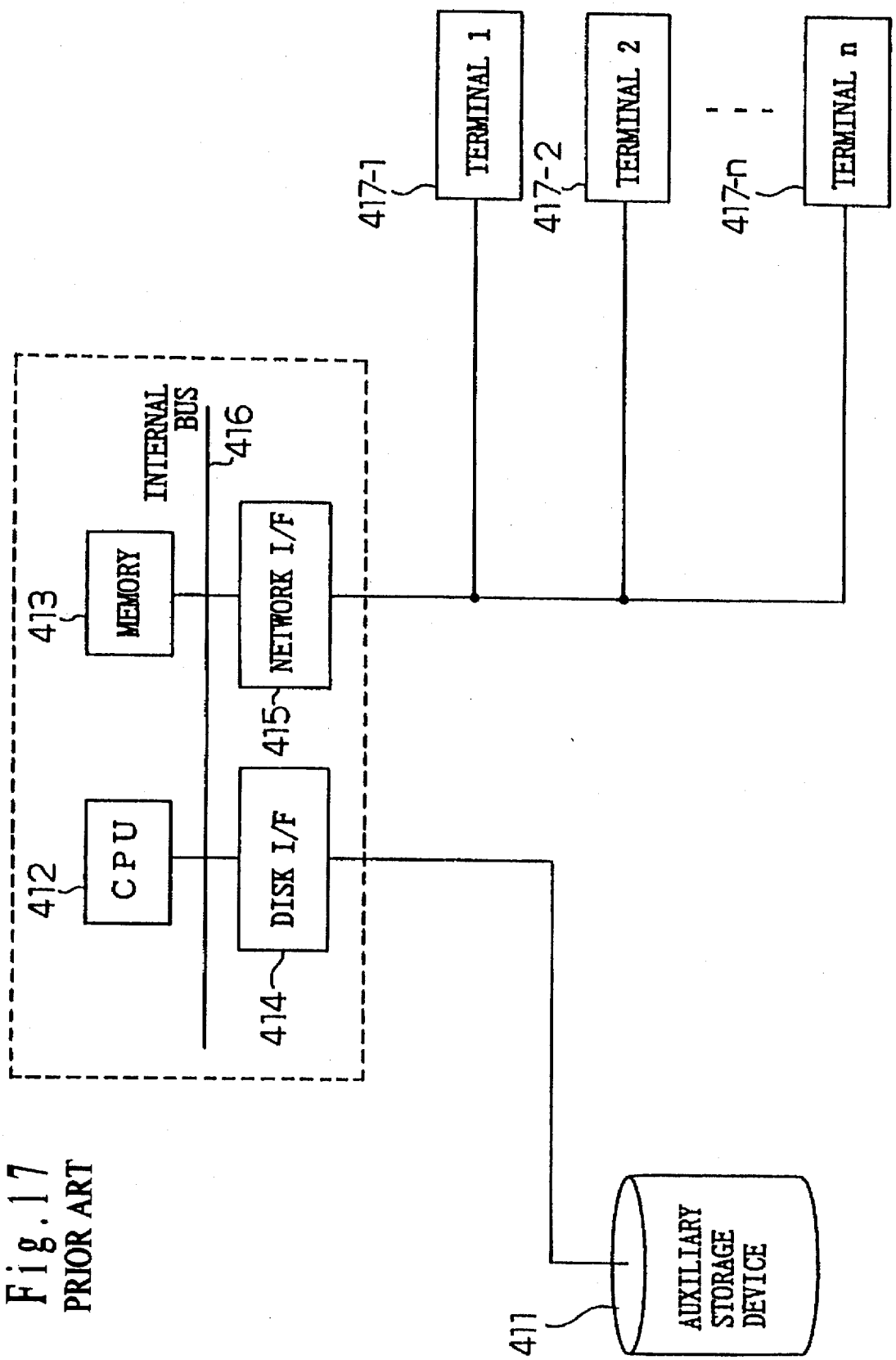
FIG. 17 is a block diagram showing a specific example of the prior art file server device of FIG. 16.

FIG. 12 shows data stored in the auxiliary storage device 11 that the terminals read; the data that the terminal 19-1 reads are blocks 1 to n of data 1, and likewise, the data that the terminal 19-n reads are blocks 1 to n of data n.

The operation of this embodiment will be described in detail below with reference to FIGS. 6 and 9 to 15. It is assumed here that there are two prefetch fill sections, two buffer sections, and two terminals, that the data to be read by the terminals are stored in the auxiliary storage device 11 as shown in FIG. 12, and that the buffer sections are configured as shown in FIGS. 13a–13g and 14a–14e.

(1) The terminal 19-1 outputs a data read request for block 1 of data 1, and the terminal 19-2 outputs a data read request for block 1 of data 2, to the request accepting section 15.

(2) Upon accepting the data read requests sent by the terminals 19-1 and 19-2, the request accepting section 15 outputs data read requests for block 1 of data 1 and for block 1 of data 2 to the displacement judging section 16.

Figure 9:
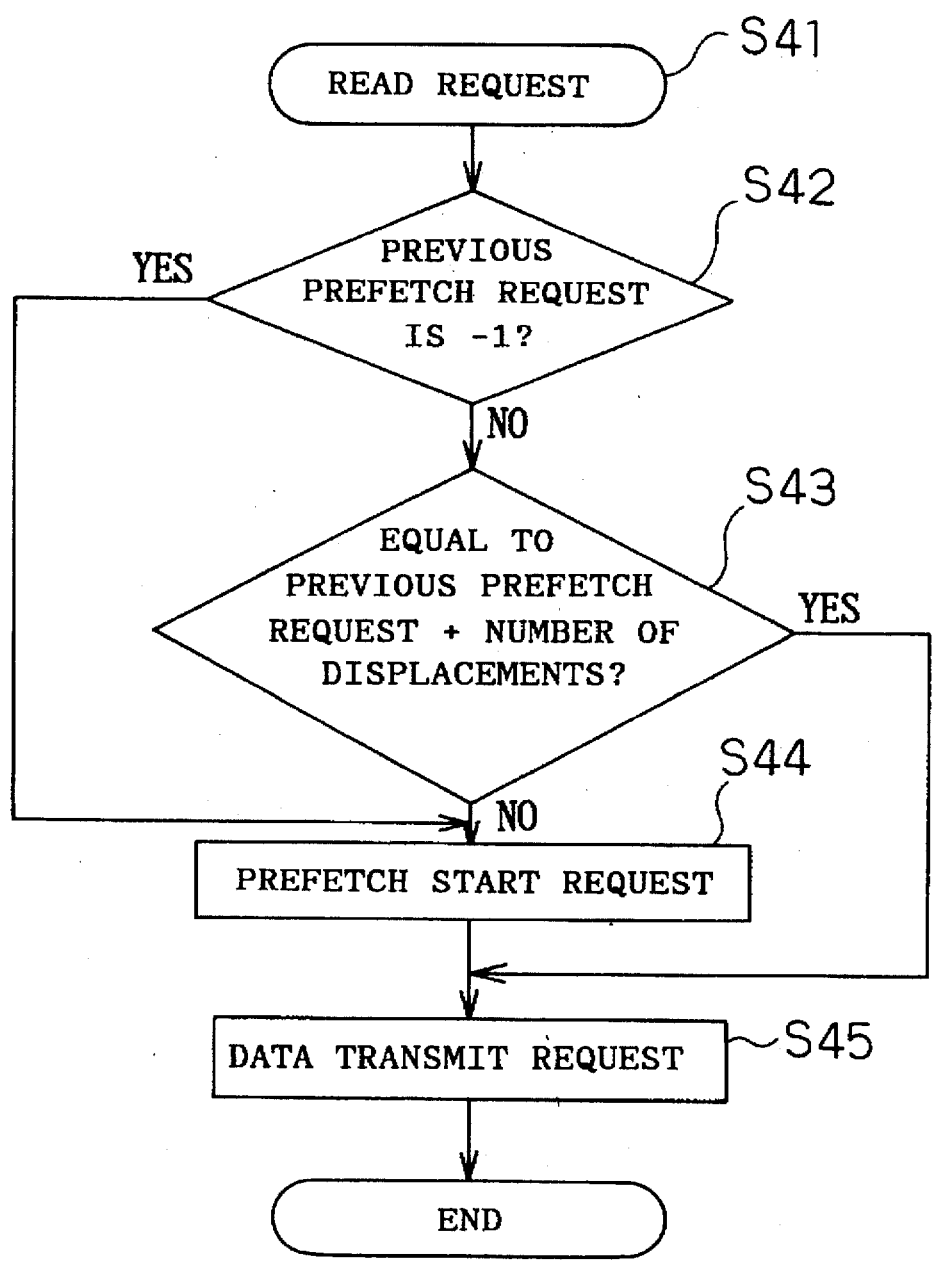
FIG. 9 is an operation flow diagram of a displacement judging section according to the third embodiment.

(3) In accordance with the operation flow diagram of FIG. 9, the displacement judging section 16 judges whether it is necessary to initiate a prefetch operation, by referencing a prefetch judgement table in which the block number of the previous data read request and the number of displaced blocks are stored for each data as shown in FIGS. 15a–15e. The initial values are −1 for the block number and 1 for the number of displaced blocks, as shown in part 9-1 of FIG. 15.

First, when a data read request for block 1 of data 1 is received from the request accepting section 15 (step S41), the displacement judging section 16 retrieves the block number of the previous data read request for data 1 from the table shown in part 9-1 of FIG. 15, and determines whether the block number is −1 or not (step S42).

In this case, since the block number is −1, it is determined that the requested block has not yet been prefetched by the prefetch fill section 12-1; therefore, a prefetch request for block 1 of data 1 is sent to the prefetch request distributing section 17 (step S44), a data transmit request for block 1 of data 1 is output to the transmit request distributing 18 (step S45), and "1" is written as the block number of the previous data read request for data 1 in the prefetch judgement table. The resulting table contents are shown in 9-2 of FIG. 15.

Likewise, the displacement judging section 16 receives a data read request for block 1 of data 2 from the request accepting section 15. Then, from the block number of the previous data read request for data 2 retrieved from the table shown in 9-2 of FIG. 15, the displacement judging section 16 determines that the requested data has not yet been prefetched by the prefetch fill section 12-2 (step S42), and sends a prefetch request for block 1 of data 2 to the prefetch request distributing section 17 (step S44), and a data transmit request for block 1 of data 2 to the transmit request distributing section 18 (step S45), while writing "1" as the block number of the previous data read request for data 2 in the prefetch judgement table. The resulting table contents are shown in 9-3 of FIG. 15.

(4) The prefetch request distributing section 17 has the function of distributing the prefetch requests so that the prefetch requests for blocks of data 1 are distributed to the prefetch fill section 12-1 and likewise, the prefetch requests for blocks of data n are distributed to the prefetch fill section 12-n. Therefore, the prefetch request for block 1 of data 1, output from the displacement judging section 16, is distributed to the prefetch fill section 12-1, and likewise, the prefetch request for block 1 of data 2 is distributed to the prefetch fill section 12-2.

(5) The transmit request distributing section 18 has the function of distributing the transmit requests so that the transmit requests for blocks of data 1 are distributed to the transmitting section 14-1 and likewise, the transmit requests for blocks of data n are distributed to the transmitting section 14-n. Therefore, the transmit request for block 1 of data 1, output from the displacement judging section 16, is distributed to the transmitting section 14-1, and likewise, the transmit request for block 1 of data 2 is distributed to the transmitting section 14-2.

Figure 10:
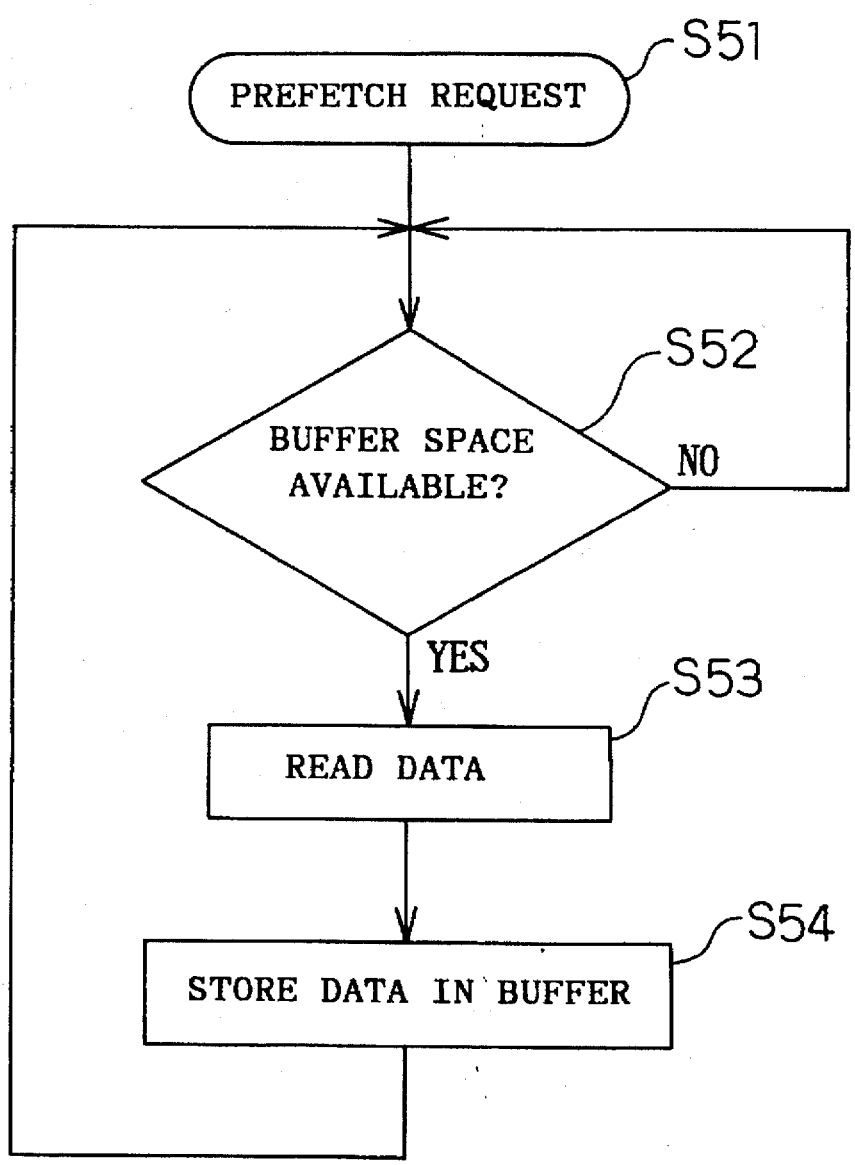
FIG. 10 is an operation flow diagram of a prefetch fill section according to the third embodiment.

(6) In accordance with the operation flow diagram of FIG. 10, when the prefetch request is received from the prefetch request distributing section 17 (step S51), the prefetch fill section 12-1 checks the buffer section 13-1 to see if free space is available there (step S52). If there is available space, as shown in part 8-1 of FIG. 13, the prefetch fill section 12-1 retrieves the requested data from the auxiliary storage device 11 (step S53), and stores the data into the buffer section 13-1 (step S54). Part 8-2 of FIG. 13 shows the resulting contents of the buffer section 13-1. Then, the buffer section 13-1 is again checked for available space (step S52); since there still is available space, further data is retrieved from the auxiliary storage device 11 (step S53) and Stored into the buffer section 13-1 (step S54). The resulting contents of the buffer section 13-1 are shown in part 8-3 of FIG. 13. Again, the buffer section 13-1 is checked for available space (step S52); since there is no space available, the prefetch fill section 12-1 waits until free space becomes available.

As with the prefetch fill section 1271, the prefetch fill section 12-2 reads data from the auxiliary storage device 11 and stores them in the buffer section 13-2, in accordance with the operation flow diagram of FIG. 10. The resulting contents are shown in 8-4 of FIG. 13.

Figure 11:
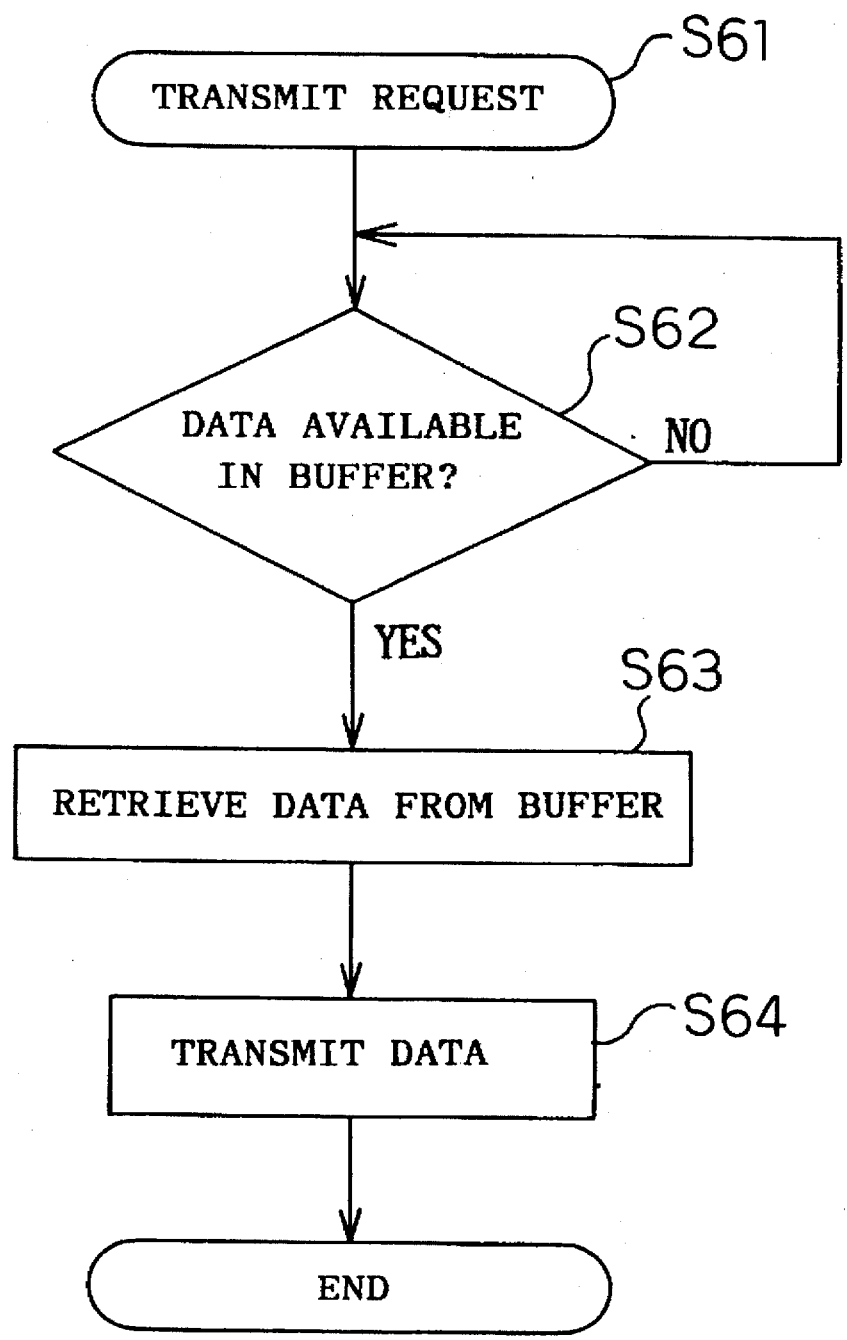
FIG. 11 is an operation flow diagram of a transmitting section according to the third embodiment.

(7) In accordance with the operation flow diagram of FIG. 11, when the data transmit request is received from the transmit request distributing section 18 (step S61), the transmitting section 14-1 checks the buffer section 13-1 to see if the requested data is stored there (step S62). Since the buffer section 13-1 is in the state shown in part 8-4 of FIG. 13, with block 1 of data 1 residing there, the transmitting section 14-1, retrieves that data (step S63), putting the buffer section 13-1 in the state of 8-5 of FIG. 13, and transmits block 1 of data 1 to the terminal 19-1 (step S64). When the buffer section 13-1 is put in the state of 8-5 of FIG. 13, free space is now made available in the buffer section 13-1; therefore, the prefetch fill section 12-1 reads data from the auxiliary storage device 11 and stores it in the buffer section 13-1, the resulting contents thereof being shown in part 8-6 of FIG. 13.

As with the transmitting section 14-1, in accordance with the operation flow diagram of FIG. 11 the transmitting section 14-2 retrieves data from the buffer section 13-2, putting the buffer section 13-2 in the state shown in part 8-7 of FIG. 13, and transmits block 1 of data 2 to the terminal 19-2. Since free space is now available in the buffer section 13-2, the prefetch fill section 12-2 reads data from the auxiliary storage device 11 and stores it in the buffer section 13-2, the resulting contents thereof being shown in part 8-8 of FIG. 14.

(8) The terminal 19-1 receives block 1 of data 1 output from the transmitting section 14-1, while the terminal 19-2 receives block 1 of data 2 output from the transmitting section 14-2.

(9) The terminal 19-1 sends a data read request for a block number incremented by 1 from the previously requested block number of data 1, and the terminal 19-2 sends a data read request for a block number incremented by 1 from the previously requested block number of data 2, to the request accepting section 15.

(10) Upon reception of the data read requests sent by the terminals 19-1 and 19-2, the request accepting section 15 sends the data read requests for block 2 of data 1 and block 2 of data 2 to the displacement judging section 16.

(11) In accordance with the operation flow diagram of FIG. 9, when the data read request for block 2 of data 1 is received from the request accepting section 15 (step S41), the displacement judging section 16 retrieves the block number of the previous data read request for data 1 from the table shown in part 9-3 of FIG. 15, and determines whether that block number is −1 or not (step S42). In this case, since the block number is 1, the process proceeds to the next step. The data read request sent by the request accepting section 15 is compared with the value obtained by adding the number of displaced blocks to the block number of the previous data read request, i.e., with 2 ('step S43). Since they are equal, the displacement judging section 16 determines that the requested data is already prefetched by the prefetch fill section 12-1, and sends a data transmit request for block 2 of data 1 to the transmit request distributing section 18 (step S45), while writing "2" as the block number of the previous data read request for data 1 in the prefetch judgement table. The resulting table contents are shown in part 9-4 of FIG. 15.

Likewise, the displacement judging section 16 receives a data read request for block 2 of data 2 from the request accepting section 15. From the block number of the previous data read request for data 2 in the table shown in 9-4 of FIG. 15, the displacement judging section 16 determines that the requested data is already prefetched by the prefetch fill section 12-2, and sends a data transmit request for block 2 of data 2 to the transmit request distributing section 18, while writing "2" as the block number of the previous data read request for data 2 in the prefetch decision table. The resulting table contents are shown in part 9-5 of FIG. 15.

(12) The transmit request distributing section 18 distributes the transmit request for block 2 of data 1, received from the displacement judging section 16, to the transmitting section 14-1, and likewise, the transmit request for block 2 of data 2 to the transmitting section 14-2.

(13) In accordance with the operation flow diagram of FIG. 11, when the data transmit request is received from the transmit request distributing section 18 (step S61), the transmitting section 14-1 checks the buffer section 13-1 to see if the requested data is stored there (step S62). Since the buffer section 13-1 is in the state shown in part 8-8 of FIG. 14, with block 2 of data 1 residing there, the transmitting section 14-1 retrieves that data (step S63), and transmits block 2 of data 1 to the terminal 19-1 (step S64), putting the buffer section 13-1 in the state of 8-9 of FIG. 14. Since free space is now made available in the buffer section 13-1, the prefetch fill section 12-1 reads data from the auxiliary storage device 11 and stores it in the buffer section 13-1, the resulting contents thereof being shown in part 8-10 of FIG. 14.

As with the transmitting section 14-1, in accordance with the operation flow diagram of FIG. 11 the transmitting section 14-2 retrieves data from the buffer section 13-2, and transmits block 2 of data 2 to the terminal 19-2, now putting the buffer section 13-2 in the state shown in 8-11 of FIG. 14.

Since free space is now available in the buffer section 13-2, the prefetch fill section 12-2 reads data from the auxiliary storage device 11 and stores it in the buffer section 13-2, the resulting contents thereof being shown in part 8-12 of FIG. 14.

(14) The terminal 19-1 receives block 2 of data 1 output from the transmitting section 14-i, while the terminal 19-2 receives block 2 of data 2 output from the transmitting section 14-2.

(15) Processing of (9) to (14) is repeated.

Thus, according to the file server device of the third embodiment, the operations of retrieving data from the auxiliary storage device in accordance with data read requests sent by the respective terminals and transmitting the retrieved data to the respective terminals are performed by the plurality of prefetch fill sections, buffer sections, and transmitting sections independently for each individual terminal.

As described above, in the configuration comprising an auxiliary storage device 11 for storing data, a plurality of prefetch fill sections 12-1 to 12-n for prefetching data from the auxiliary storage device 11, a plurality of buffer sections 13-1 to 13-n for storing the prefetched data, a request accepting section 15 for accepting data read requests sent by terminals, a displacement judging section 16 for judging whether prefetching is necessary from the data read request received from each terminal, a prefetch request distributing section 17 for distributing each prefetch request to the appropriate one of the prefetch fill sections 12-1 to 12-n that corresponds to the requesting terminal, a transmit request distributing section 18 for distributing each transmit request to the appropriate one of transmitting sections 14-1 to 14-n that corresponds to the requesting terminal, and a plurality of transmitting sections 14-1 to 14-n for transmitting data to the respective terminals, the plurality of prefetch fill sections 12-1 to 12-n, buffer sections 13-1 to 13-n, and transmitting sections 14-1 to 14-n associated with the respective terminals retrieve data from the auxiliary storage device 11 and transmit the retrieved data to the requesting terminals independently for each individual terminal, thus distributing the data over the internal buses of the file server device, and also allowing the number of terminals to be increased by increasing the numbers of prefetch fill sections, buffer sections, and transmitting sections.

The operation of the third embodiment described above has assumed the use of one auxiliary storage device, two prefetch fill sections, two buffer sections, and two data areas in each buffer section, but it will be appreciated that the number of each of these component elements may be freely chosen.

Furthermore, in the third embodiment described above, only one displacement judging section was provided. Alternatively, the request accepting section may be constructed to demultiplex the input into a plurality of data request requests and more than one displacement judging section may be provided, in which case the prefetch request distributing section and the transmit request distributing section can be omitted.

For example in FIG. 7 the displacement judging section provided at a block (abridged as "parent block" hereinafter) which is constituted by CPU 21-0 etc. is changed to be provided at each block (abridged as "child block" hereinafter) which is constituted by CPU 21-1 to 21-n etc. That is since each child block has the displacement judging section, the parent block only transmits the data read request received from each terminal to each child block and each child block executes other processing. By such embodiment even when the number of the terminals and the number of the data read requests increase, the prefetch requests and the transmit requests are dispersed by the child blocks and then the parent block does not reach the limit. Further one can easily respond against the increase of the terminals by increasing the child blocks, for example, by increasing the card type child blocks.

Further, in the third embodiment described above, in the prefetch judgement table shown in FIG. 15 the number of displaced blocks was set to 1, but this may be set to any desired value. For example, if the number of displaced blocks is set to 5, fast forward playback can be performed, and if it is set to −1, reverse playback can be performed.

Moreover, in the third embodiment described above, the decision as to whether the requested data is already prefetched was made using the block number as an index pointing to the data, but alternatively, the data itself may be used if the decision can be made by using it.

(Embodiment 4)

Figure 18:
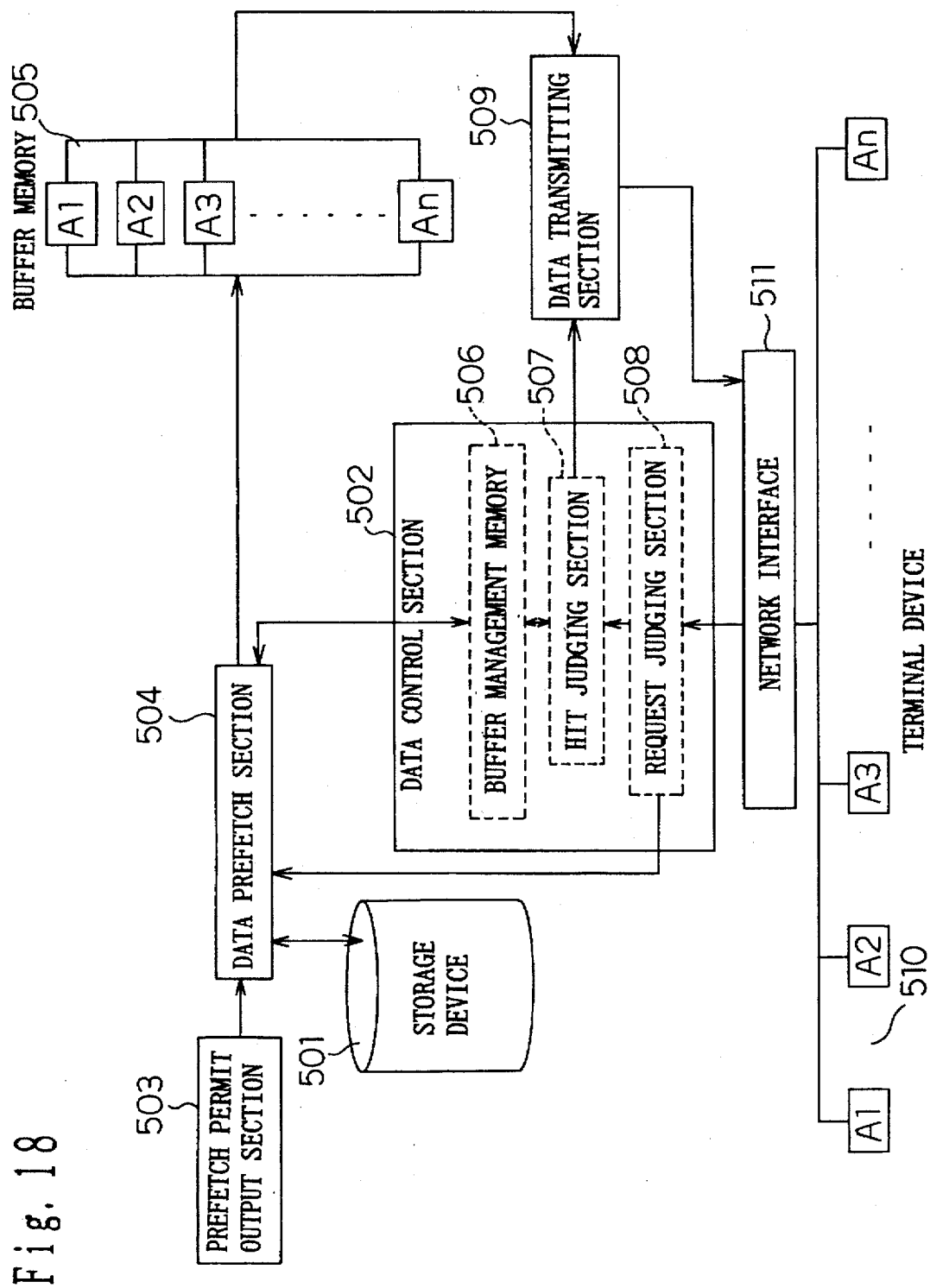
FIG. 18 is a block diagram of a system employing a data transfer control method according to a fourth embodiment of the present invention.

FIG. 18 is a block diagram showing the configuration of a system employing a data transfer control method according to a fourth embodiment of the invention. In FIG. 18, reference numeral 501 is a storage device for storing data; 502 is a data control section for controlling data transmission; 503 is a prefetch permit output section for outputting a prefetch permit instruction at predetermined intervals of time; 505 is a buffer memory (actually n buffer memories from A1 to An) for temporarily storing data in corresponding relationship to each terminal; 504 is a data prefetch section for retrieving data requested by the terminal 510 and data contiguous to the requested data from the storage device 501 and for transferring the retrieved data to the buffer memory 505; 506 is a buffer management memory for storing information on data stored in the buffer memory 505; 508 is a request judging section for judging whether the data requested by the terminal 510 is data contiguous to the data previously requested by the same terminal 510; 507 is a hit judging section for judging whether the data requested by the terminal 510 is available in the buffer memory 505; and 509 is a data transmitting section for transmitting data stored in the buffer memory 505 to the terminal 510.

A practical system requires various other component elements, such as a controller for controlling inputs/outputs of the storage device 501 and a receiver for receiving data sent via a network interface 511, but such component elements are omitted here since they are not components subsumed under the present invention.

Figure 19:
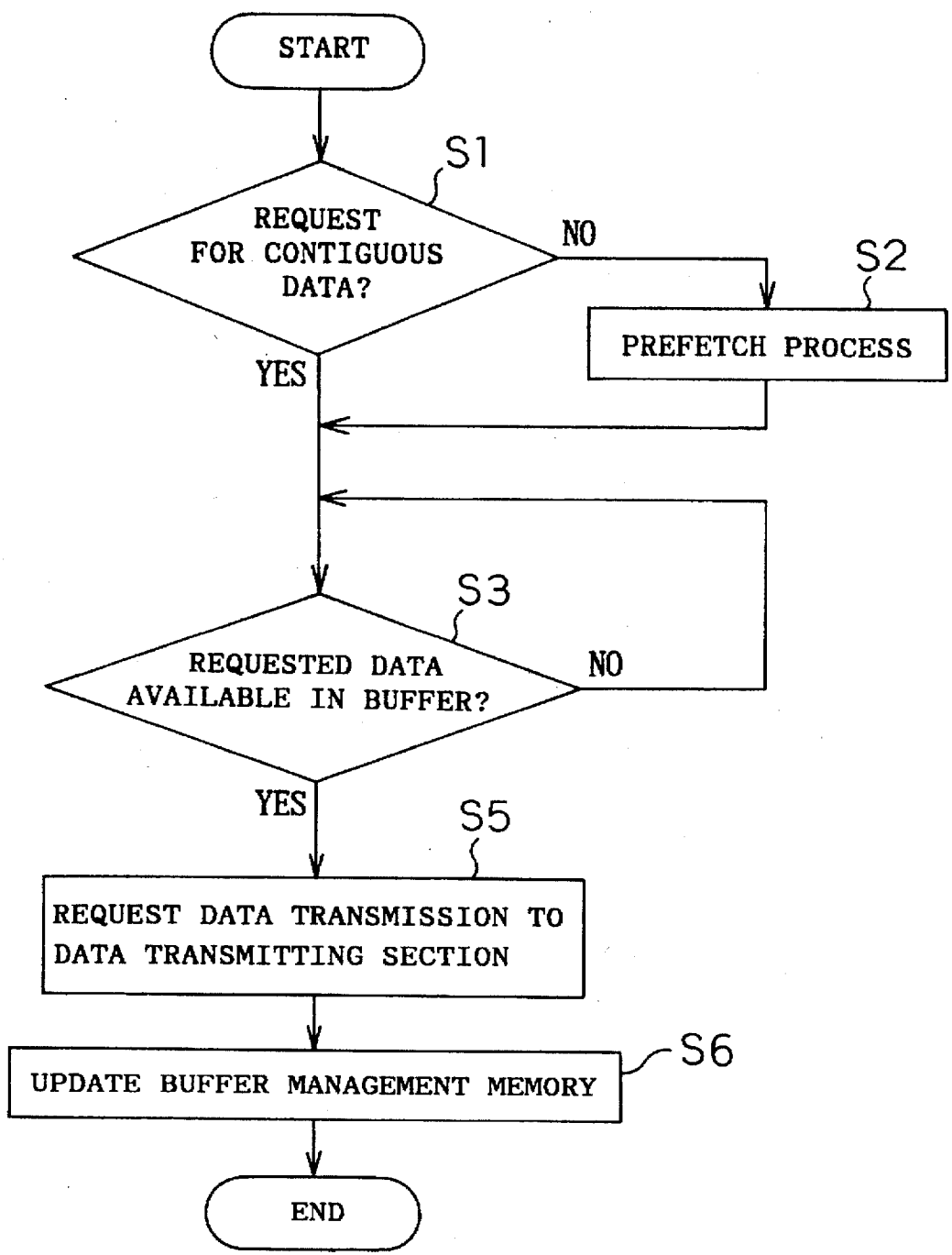
FIG. 19 is a flowchart illustrating the processing flow of the fourth embodiment.

Processing is carried out in accordance with the algorithm shown in FIG. 19.

(1) The request judging section 508 judges whether the data requested by the terminal 510 is data contiguous to the previously requested data (step S1). This can be accomplished, for example, by storing the start address and end address of the data previously requested by the same terminal 510, and by checking Whether the start address of the currently requested data coincides with the end address of the previously requested data and thereby determining whether or not the currently requested data is contiguous to the previously requested data.

Figure 21:
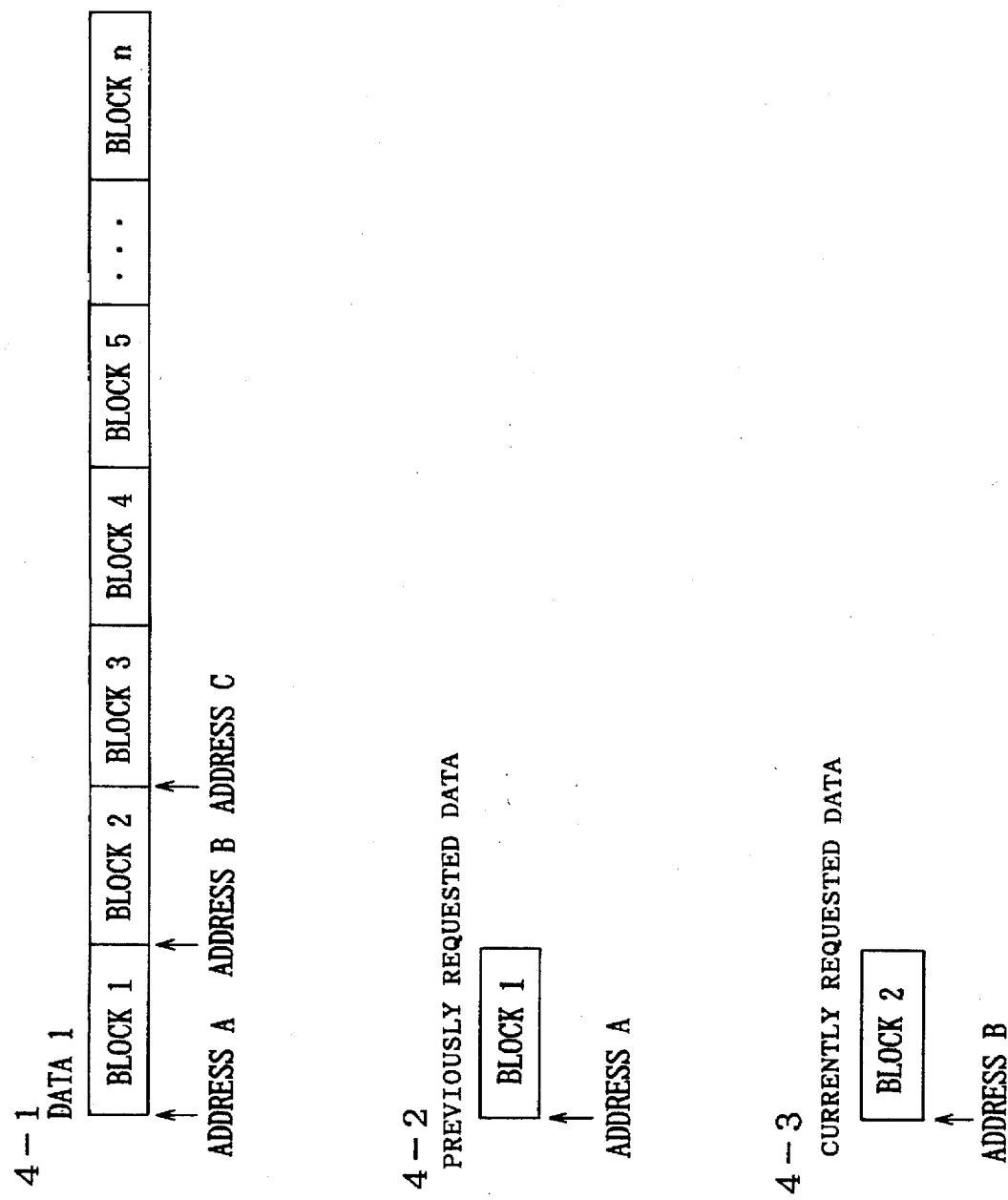
FIG. 21 is a schematic diagram illustrating an example of data requested by a terminal.
Figure 27:
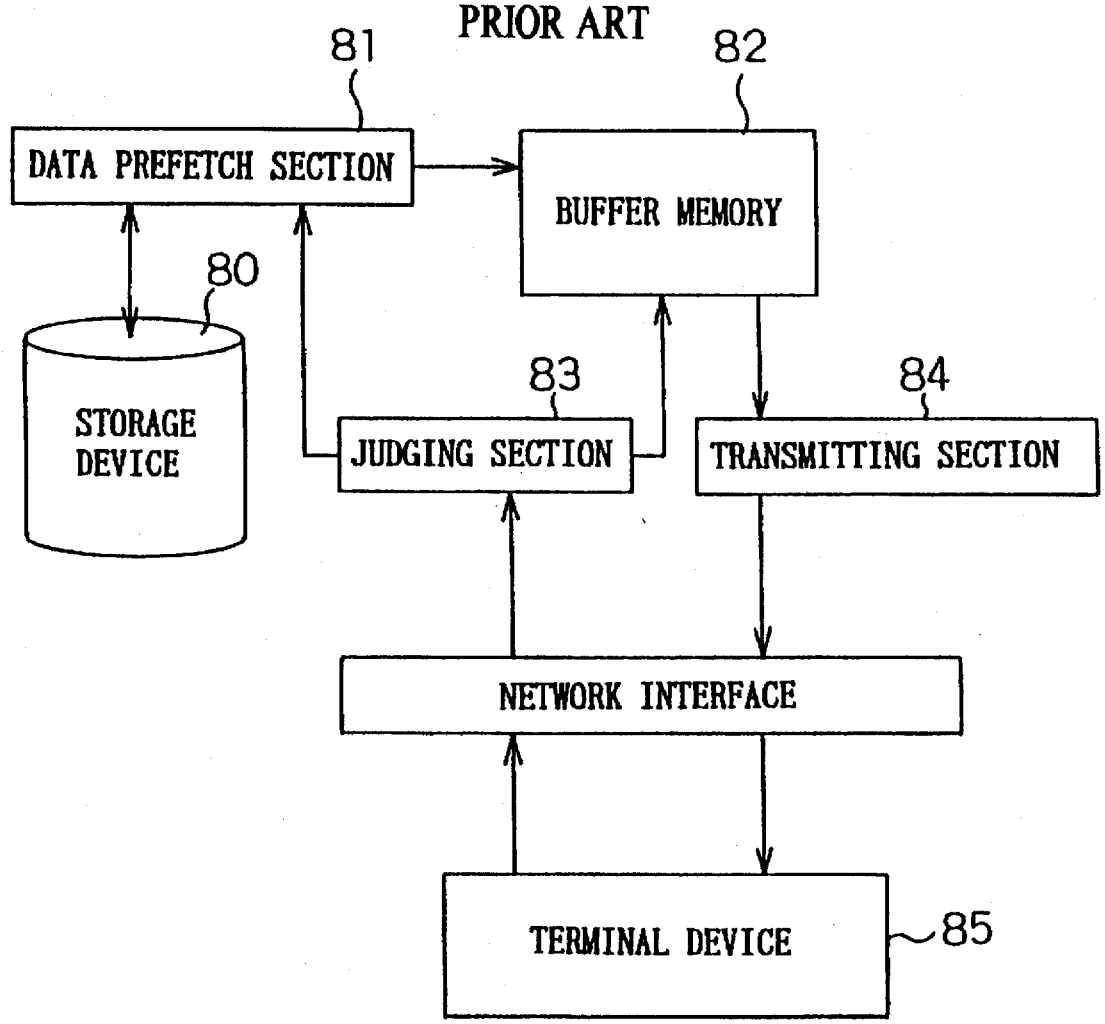
FIG. 27 is a diagram showing the configuration of a system employing a data transfer control method according to the prior art.

FIG. 21 is a diagram fox explaining by way of example how the requested data is judged as being contiguous or not contiguous. Suppose we have data 1 consisting of n blocks as shown in part 4-1 of FIG. 21. When the previously requested data was block 1 of data 1, as shown in 4-2, if block 2 of data 1 starting at address B, as shown in 4-3, is requested this time, then the currently requested data is judged as being contiguous to the previously requested data. In this manner, the judgement may be made by checking the requested start address and end address. Alternatively, the judgement may be made by storing the block number itself and by checking whether the currently requested data starts with the block number contiguous to the last block number of the previously requested data.

(2) If the requested data is judged in step S1 as being not contiguous to the previously requested data, a prefetch process is carried out by the data prefetch section 504 (step S2).

Figure 20:
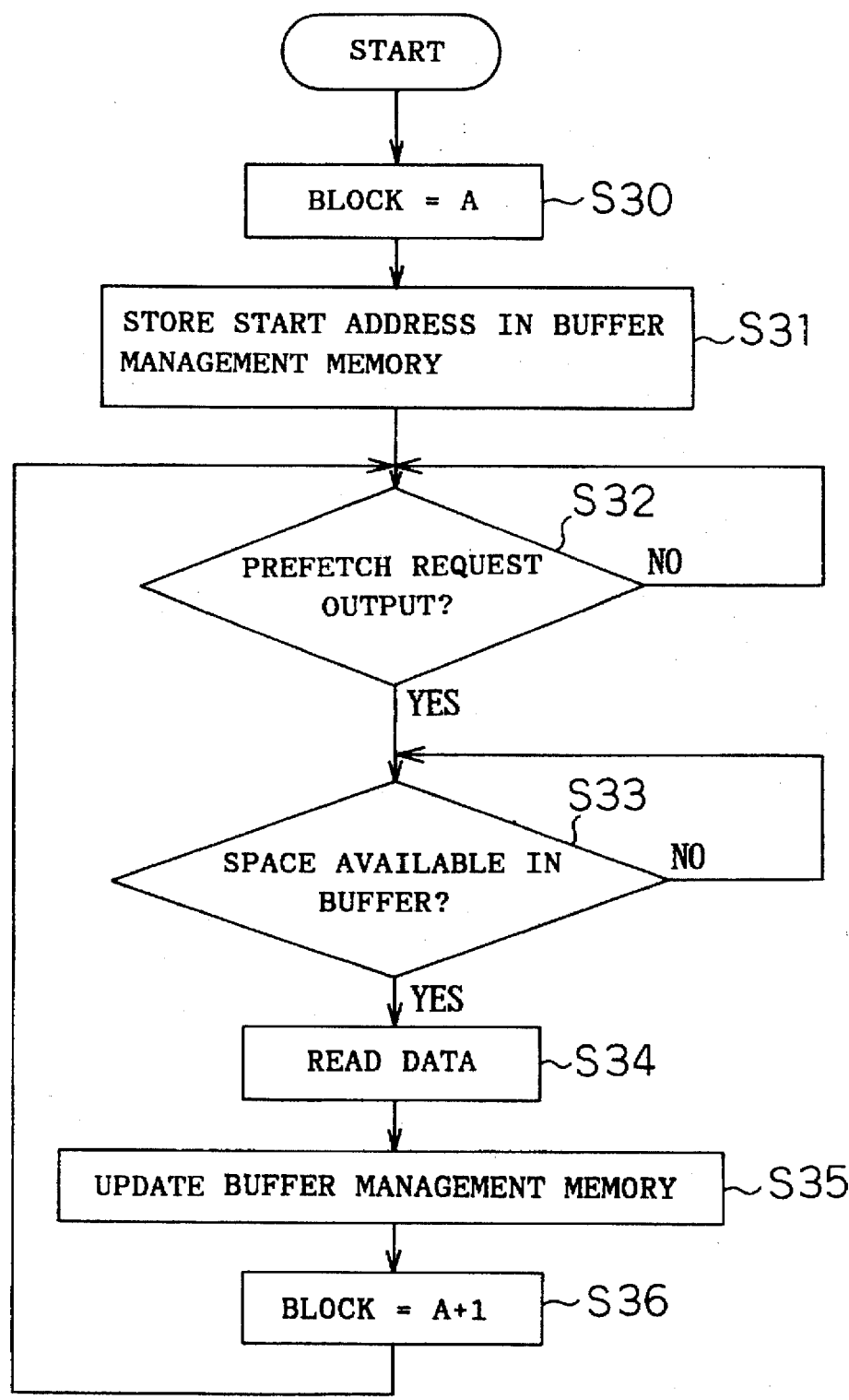
FIG. 20 is a flowchart illustrating the processing flow of a data prefetch section according to the fourth embodiment.

The data prefetch section 504 carries out the prefetch process in accordance with the algorithm shown in FIG. 20. It is assumed here that data starting at address A is requested.

(2-1) The start address A of the requested data is assigned to a counter called "block" (step S30).

(2-2) Next, the start address A is stored in the buffer management memory 506 (step S31).

(2-3) After that, a permit waiting state continues until a prefetch permit is output from the prefetch permit output section 503 (step S32). The prefetch permit is output at prescribed intervals of time, for example, at intervals of one second, for each terminal.

(2-4) When the prefetch permit is output, the buffer memory 505 is checked to see if any free space is available there, by referencing the information stored in the buffer management memory 506 (step S33). The information stored in the buffer management memory 506 is, for example, as shown in FIG. 22; information on data held in the buffer memory 505 and information on available space in the buffer memory 505 are stored for each terminal. By referencing such information, if there is available space in the buffer memory 505, the process proceeds to step S34; otherwise, a waiting state continues until free space becomes available.

(2-5) If there is available space in the buffer memory 505, data of A block is retrieved from the storage device 501 (step S34).

(2-6) Data of the block retrieved in step S34 is stored in the buffer memory 505, and the contents of the buffer management memory 506 are updated (step S35). When the information is stored in the format shown in FIG. 22, the data length is added by one block and the value of free area is subtracted by one block.

(2-7) The value of the counter "block" is added to 1 (step S36), and the process returns to step S32 described in (2-3). After that, the data prefetch section 504 repeats the processing of (2-3) to (2-7) as long as free space is available in the buffer memory 505.

Next, the process returns to FIG. 19.

(3) The prefetch process shown in FIG. 20 is carried out as described above. Next, the hit judging section 507 judges whether the data requested by the terminal 510 is available in the buffer memory 505, by referencing the information stored in the buffer management memory 506 (step S3), and waits until the requested data is transferred out to the buffer memory 505. If it is judged from the information such as shown in FIG. 22 that the requested data exists within the range shown, the hit judging section 507 requests transmission of the requested data block from the buffer memory 505 to the data transmitting section 509 (step S5).

(4) After that, the data transmitting section 509 transmits the requested data to the terminal 510 via the network interface 511.

(5) After transmitting the data to the terminal 510, the hit judging section 507 updates the information stored in the buffer management memory 506 (step S6). For example, when information such as shown in FIG. 22 is stored, the values of the start address, data length, and free area are updated so that the buffer management memory 506 points to the data excluding the transmitted data block.

(6) As the result of updating the data in the buffer management memory 506, free space becomes available in the buffer memory 505, and the prefetch process in step S2 is further continued until all free areas in the buffer memory 505 are used up.

Next, how the contents of the buffer memory 505 change will be described in detail with reference to drawing.

FIGS. 23 and 24 show the contents of the buffer memories A1 and A2 corresponding to the terminals A1 and A2, respectively.

First, as shown in part 6-1 of FIG. 23, there are free areas available in the buffer memories A1 and A2. Suppose here that a request was made from the terminal A1 for block 1 of data 1 which is not contiguous to the previously requested data. Since space is available in the buffer memory A1, the data prefetch section 504 stores block 1 of data 1 in the buffer memory A1 as shown in part 6-2. Suppose now that a request for block 1 of data 2 was made from the terminal A2. Since space is available in both the buffer memories A1 and A2, as shown in part 6-2, block 2 of data 1 which is contiguous to block 1 of data 1 is stored into the buffer memory A1, and block 1 of data 2 into the buffer memory A2, as shown in part 6-3. The data prefetch section 504 further tries to transfer the next block 3 of data 1 to the buffer memory A1 but waits the transfer since no space is available in the buffer memory A1, as shown in part 6-3. On the other hand, since space is available in the buffer memory A2, as shown in part 6-3, block 2 of data 2 which is contiguous to block 1 of data 2 is stored into the buffer memory A2, as shown in part 6-4.

When block 1 of data 1 stored in the buffer memory A1 is thereafter transmitted to the terminal A1 by means of the transmitting section 509, free space now becomes available in the buffer memory A1, as shown in part 6-5 of FIG. 24. Then, the data prefetch section 504 transfers block 3 of data 1 to the buffer memory A1 whose contents are now as shown in part 6-6.

Further, when block 1 of data 2 is transmitted to the terminal A2 by means of the transmitting section 509, free space now becomes available in the buffer memory A2, as shown in part 6-7. Then, the data prefetch section 504 transfers block 3 of data 2 to the buffer memory A2, as shown in part 6-8. In this manner, the data prefetch section 504 continues to transfer contiguous data to the buffer memory 505 as long as free space is available in the buffer memory 505.

The buffer memory 505 has been described as being capable of storing only two blocks of data, but it may be designed to hold more than two blocks of data.

Referring next to FIGS. 25 and 26, an example of information stored in the buffer management memory 506 for the terminal A1 will be described in detail in accordance with the data shown in part 4-1 of FIG. 21 and the buffer memory example shown in FIGS. 23 and 24.

When the contents of the buffer memory A1 change as shown in the example of FIGS. 23 and 24, information such as shown in part 7-1 of FIG. 25 is stored in the buffer management memory 506 when the buffer memory A1 is in the state shown in part 6-1 of FIG. 23; likewise, 7-2 corresponds to 6-2, 7-3 to 6-3, 7-4 to 6-4, 7-5 of FIG. 26 to 6-5 of FIG. 24, 7-6 to 6-6, 7-7 to 6-7, and 7-8 to 6-8, the information stored in the buffer management memory 506 thus changing with the change of the buffer memory contents.

As described above, in the system comprising a storage device 501 for storing data, a buffer memory 505 for temporarily storing data in corresponding relationship to each individual terminal, a prefetch permit output section 503 for outputting a prefetch permit instruction at predetermined intervals of time, a data prefetch section 504 for retrieving data requested by the terminal 510 and, data contiguous to the requested data from the storage device 501 and for transferring the retrieved data to the buffer memory 505, a data control section 502 for controlling data transmission, and a data transmitting section 509 for transmitting data stored in the buffer memory 505 to the terminal 510, when the data control section 502 has determined that the data requested by the terminal 510 is not contiguous to the data previously requested by the same terminal 510 then the data control section 502 activates the data prefetch section 504 to retrieve the requested data and data contiguous to it and transfer them to the buffer memory 505, and at the same time, activates the data transmitting section 502 to transmit the requested data from the buffer memory 505 to the terminal 510.

On the other hand, when the data control section 502 has determined that the data requested by the terminal 510 is contiguous to the data previously requested by the same terminal 510, the data control section 502 activates the data transmitting section 509 to transmit the requested data stored in the buffer memory 505 to the terminal 510.

The data transmitting section 509 thus transmits the requested data from the buffer memory 505 to the terminal 510.

In accordance with prefetch permit instructions output at predetermined intervals of time from the prefetch permit output section 503, the data prefetch section 504 continues to output requested data and data contiguous to the requested data as long as free space is available in the buffer memory 505 corresponding to the requesting terminal.

By sequentially prefetching data in this manner, the speed of processing is improved for subsequent data read requests sent by the respective terminals. It is also made possible to prefetch data with well-balance for any terminal without concentrating on a particular terminal, thus achieving data transmission at equal rates.

In the fourth embodiment described above, the data format for the buffer management memory 506 was made up of the start address and data length as shown in FIGS. 22, 25, and 26, but in practice, the format is not limited to the illustrated example. For example, the buffer memory may be managed by the block number of the transferred data itself, or by the address on the disk (such as the cylinder number, header number, or sector number); that is, any format may be used as long as it shows the contents of the data transferred to the buffer memory and the available space in the buffer memory.

Further, in the fourth embodiment described above, the buffer memory capacity for each memory was set to 150 blocks, as shown in FIG. 22, but different capacities may be used for different terminals. Also, the capacity is not limited to the value given in the illustrated example.

The fourth embodiment has also assumed that data prefetching is performed in increments of one block, but the value of prefetch increments may be chosen freely.

Furthermore, in the fourth embodiment described above, only one data prefetch section was provided, but the embodiment is not limited to the illustrated configuration. For example, a plurality of data prefetch sections may be provided in corresponding relationship to the respective terminals, or alternatively, one data prefetch section may be provided for each buffer memory.

The all or a part of the sections or means etc. in the present inventions can be realized by softwares of computer as well as specific hardware circuits or components.

What is claimed is:

1. A data providing device comprising:

request input means for receiving data request commands which is sent over to a network from a plurality of data request means of a plurality of data request devices, said data request commands being for sequentially requesting a part of stream data;

request-command storing means for storing the data request commands received from said request input means, with grouping said request commands by the data request means;

control means for transferring, within a predetermined period, a certain number of data request commands from the data request means to data generating means via said request-command storing means;

data generating means for generating data in accordance with said data request commands; and data transmitting means for transmitting the data generated by said data generating means to said data request devices over said network.

2. The data providing device according to claim 1, wherein said certain number is a predetermined constant.

3. The data providing device according to claim 2, wherein said constant is different for the each data request means.

4. The data providing device according to claim 1, wherein said certain number is derived in such a manner that total data amount corresponding to the number of the data request commands does not exceed a predetermined threshold value.

5. A file service device comprising:

a storage device for storing data;

a plurality of prefetch fill means for prefetching data from said storage device;

a plurality of buffer means for storing the respectively prefetched data;

a plurality of transmitting means for transmitting the data stored in said buffer means to terminals;

a request accepting means for accepting a data read request, sent by a terminal, for reading data from said storage device;

prefetch judging means for judging, based on data requested by an immediately preceding data read request or on an index pointing to said data, whether data requested by said accepted data read request is already prefetched and stored in one of said buffer means; and request output means for, when it is judged that the requested data is not yet prefetched, outputting a prefetch request to one of said prefetch fill means and a transmit request to one of said transmitting means, both of said one means corresponding to the terminal issuing said data read request, and for, when it is judged that the requested data is already prefetched, outputting a transmit request to one of said transmitting means, said one means corresponding to the terminal issuing said data read request.

6. The file service device according to claim 5, wherein said request output means has a prefetch division section which distributes to the each prefetch fill means, corresponding each prefetch request, and output division section which distributes to the each transmitting means, corresponding each transmit request.

7. A data providing device comprising:

request input means for receiving data request commands which are sent over to a network from a plurality of data request means of a plurality of data request devices, said data request commands sequentially requesting a part of a stream data, said part having a size;

request-command storing means for storing the data request commands received from said request input means into a plurality of groups, the number of said groups varies responsive to the respective data request device;

control means for transferring, within a predetermined period responsive to the size of the part of the stream data and a transfer rate of data transmitting means, a certain number of data request commands from the data request means to data generating means via said request-command storing means;

data generating means for generating data in accordance with said data request commands; and data transmitting means having a transfer rate for transmitting the data generated by said data generaling means to said data request devices over said network.

8. A file service device comprising:

a storage device for storing data;

a plurality of prefetch fill means for prefetching data from said storage device;

a plurality of buffer means for storing the respectively prefetched data;

a plurality of terminals for sending a plurality of data read requests, a plurality of transmitting means for transmitting the data stored in said buffer means to said plurality of terminals;

request accepting means for accepting one of said plurality of data read requests, sent by one of said plurality of terminals, for reading data from said storage device and storing said data in one of said plurality of buffer means;

prefetch judging means for determining if said one buffer means is full; and request output means for, (1) when it is determined that said one buffer means is full, providing a transmit request to one of said plurality of transmitting means, said one transmitting means corresponding to the terminal issuing said data read request, and (2) when it is determined that said one buffer means is not full, providing a prefetch request to one of said prefetch fill means and a transmit request to said one transmitting means, said one prefetch fill means and said one transmitting means corresponding to the terminal issuing said data mad request.

* * * * *

UNITED STATES PATENT AND TRADE MARK OFFICE
CERTIFICATE OF CORRECTION

PATENT NO. : 5,687,347
DATED : November 11, 1997
INVENTOR(S) : Omura et al.

It is certified that error appears in the above-identified patent and that said Letters Patent is hereby corrected as shown below:

Column 22, line 33, delete "generaling" and insert --generating--.

Signed and Sealed this

Seventh Day of April, 1998

Attest:

BRUCE LEHMAN

*Attesting Officer*     *Commissioner of Patents and Trademarks*